() United States Patent (10) Patent No.: US 10,986,223 B1
Knas et al. (45) Date of Patent: Apr. 20, 2021

(54) SYSTEMS AND METHODS FOR PRESENTING CONTENT BASED ON USER BEHAVIOR

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US); Gareth Ross, Amherst, MA (US)

(73) Assignee: Massachusetts Mutual Life Insurance, Springfield, MA (US)

( * ) Notice: Subject to any disclaimer, the term of this patent is extended or adjusted under 35 U.S.C. 154(b) by 0 days.

(21) Appl. No.: 16/221,001

(22) Filed: Dec. 14, 2018

Related U.S. Application Data

(63) Continuation-in-part of application No. 16/022,467, filed on Jun. 28, 2018, which is a continuation of application No. 15/466,510, filed on Mar. 22, 2017, now Pat. No. 10,051,113, which is a continuation of application No. 15/466,757, filed on Mar. 22, 2017, now Pat. No. 10,178,222, application No.
(Continued)

(51) Int. Cl.
*H04W 4/80* (2018.01)
*H04M 1/725* (2021.01)
*H04W 4/02* (2018.01)
*H04W 4/70* (2018.01)
*H04W 84/12* (2009.01)

(52) U.S. Cl.
CPC ... *H04M 1/72577* (2013.01); *H04M 1/72569* (2013.01); *H04W 4/027* (2013.01); *H04W 4/70* (2018.02); *H04W 4/80* (2018.02); *H04W 84/12* (2013.01)

(58) Field of Classification Search
CPC ....... H04W 4/02; H04W 4/021; H04W 4/024; H04W 4/029; H04W 4/04; H04W 4/027; H04W 4/70; H04W 4/80; H04W 84/12; H04M 1/72577; H04M 1/72569
IPC .................................. H04W 4/027,4/80, 4/70
See application file for complete search history.

(56) References Cited

U.S. PATENT DOCUMENTS 6,067,069 A 5/2000 Krause
7,786,975 B2 8/2010 Ording et al.
(Continued)

OTHER PUBLICATIONS

Oscar de Brujin et al., "Rapid Serial Visual Presentation: A space-time trade-off in information presentation", Imperial College of Science, Technology & Medicine. Department of Electrical and Electronic Engineering, 2000.

*Primary Examiner* — Jean A Gelin
(74) *Attorney, Agent, or Firm* — Foley & Lardner LLP

(57) ABSTRACT

Systems and methods for displaying customized product information on a user device. A server may receive sensor data from one or more tracking sensors of a mobile device of a user, wherein the sensor data contains sensor measurements made continuously by the one or more tracking sensors and generate a behavioral pattern data records based upon the sensor data. The server may calculate a likelihood score associated with a product based on the behavioral pattern data records and identify a phase associated with the user and the product. The server may then cause to display customized electronic content for a product on a user interface of the mobile device based on the likelihood score and the identified phase.

20 Claims, 13 Drawing Sheets

Related U.S. Application Data

16/221,001, which is a continuation-in-part of application No. 14/576,809, filed on Dec. 19, 2014, now abandoned.

(60) Provisional application No. 62/311,644, filed on Mar. 22, 2016, provisional application No. 62/311,461, filed on Mar. 22, 2016, provisional application No. 61/920,087, filed on Dec. 23, 2013.

(56) References Cited

U.S. PATENT DOCUMENTS

| | | | |
|---|---|---|---|
| 8,714,983 B2 * | 5/2014 | Kil | G06Q 50/22 |
| | | | 434/247 |
| 8,954,835 B1 * | 2/2015 | Cabanero | G06F 16/94 |
| | | | 715/206 |
| 9,336,259 B1 | 5/2016 | Kane | |
| 9,594,725 B1 * | 3/2017 | Cook | G06F 3/0482 |
| 10,051,113 B1 | 8/2018 | Knas et al. | |
| 10,178,222 B1 | 1/2019 | Knas et al. | |
| 2002/0115436 A1 | 8/2002 | Howell et al. | |
| 2003/0236622 A1 | 12/2003 | Schofield | |
| 2004/0141636 A1 | 7/2004 | Liang et al. | |
| 2005/0088291 A1 | 4/2005 | Blanco et al. | |
| 2006/0256133 A1 | 11/2006 | Rosenberg | |
| 2007/0006098 A1 | 1/2007 | Krumm et al. | |
| 2007/0117072 A1 | 5/2007 | Adjali et al. | |
| 2007/0259654 A1 * | 11/2007 | Oijer | H04L 51/02 |
| | | | 455/415 |
| 2008/0172261 A1 | 7/2008 | Albertson et al. | |
| 2009/0006295 A1 | 1/2009 | Angell et al. | |
| 2009/0119600 A1 | 5/2009 | O'Sullivan et al. | |
| 2009/0133047 A1 | 5/2009 | Lee et al. | |
| 2009/0221279 A1 | 9/2009 | Rutledge | |
| 2010/0141662 A1 * | 6/2010 | Storey | G10L 13/00 |
| | | | 345/473 |
| 2010/0161409 A1 | 6/2010 | Ryu et al. | |
| 2011/0093159 A1 | 4/2011 | Boling et al. | |
| 2012/0039505 A1 | 2/2012 | Bastide et al. | |
| 2012/0256967 A1 | 10/2012 | Baldwin et al. | |
| 2012/0265977 A1 | 10/2012 | Ewell, Jr. et al. | |
| 2013/0040600 A1 | 2/2013 | Reitnour et al. | |
| 2013/0063304 A1 | 3/2013 | O'Regan et al. | |
| 2013/0150004 A1 | 6/2013 | Rosen | |
| 2013/0238422 A1 | 9/2013 | Saldanha | |
| 2013/0238425 A1 | 9/2013 | Saldanha et al. | |
| 2014/0019167 A1 | 1/2014 | Cheng et al. | |
| 2014/0045477 A1 | 2/2014 | Ewell, Jr. et al. | |
| 2014/0089801 A1 | 3/2014 | Agrawal | |
| 2014/0118140 A1 | 5/2014 | Amis | |
| 2014/0210625 A1 * | 7/2014 | Nemat-Nasser | G08B 21/06 |
| | | | 340/575 |
| 2014/0210863 A1 | 7/2014 | Osaka | |
| 2014/0289323 A1 * | 9/2014 | Kutaragi | H04L 67/42 |
| | | | 709/203 |
| 2014/0309849 A1 * | 10/2014 | Ricci | G06Q 10/00 |
| | | | 701/33.4 |
| 2014/0359647 A1 | 12/2014 | Shoemake et al. | |
| 2015/0086072 A1 | 3/2015 | Kompalli et al. | |
| 2015/0099480 A1 | 4/2015 | Reiter | |
| 2015/0205494 A1 | 7/2015 | Scott et al. | |
| 2015/0234457 A1 | 8/2015 | Kempinski | |
| 2015/0245084 A1 | 8/2015 | Downing et al. | |
| 2015/0347903 A1 | 12/2015 | Saxena et al. | |
| 2015/0364109 A1 | 12/2015 | Jain et al. | |
| 2015/0370435 A1 | 12/2015 | Kirmse et al. | |
| 2016/0132530 A1 | 5/2016 | Misu et al. | |
| 2016/0162478 A1 | 6/2016 | Blassin et al. | |
| 2016/0189423 A1 | 6/2016 | Kaeser et al. | |
| 2016/0198306 A1 * | 7/2016 | Miles | G06Q 10/0639 |
| | | | 455/456.3 |
| 2016/0225012 A1 | 8/2016 | Ha et al. | |
| 2017/0039784 A1 | 2/2017 | Gelbart et al. | |
| 2017/0147095 A1 | 5/2017 | Nicholls et al. | |
| 2017/0188168 A1 | 6/2017 | Lyren et al. | |
| 2017/0210288 A1 | 7/2017 | Briggs et al. | |
| 2018/0367835 A1 | 12/2018 | Hamidi-Rad et al. | |
| 2020/0005364 A1 * | 1/2020 | Aznaurashvili | G06Q 30/0281 |

* cited by examiner

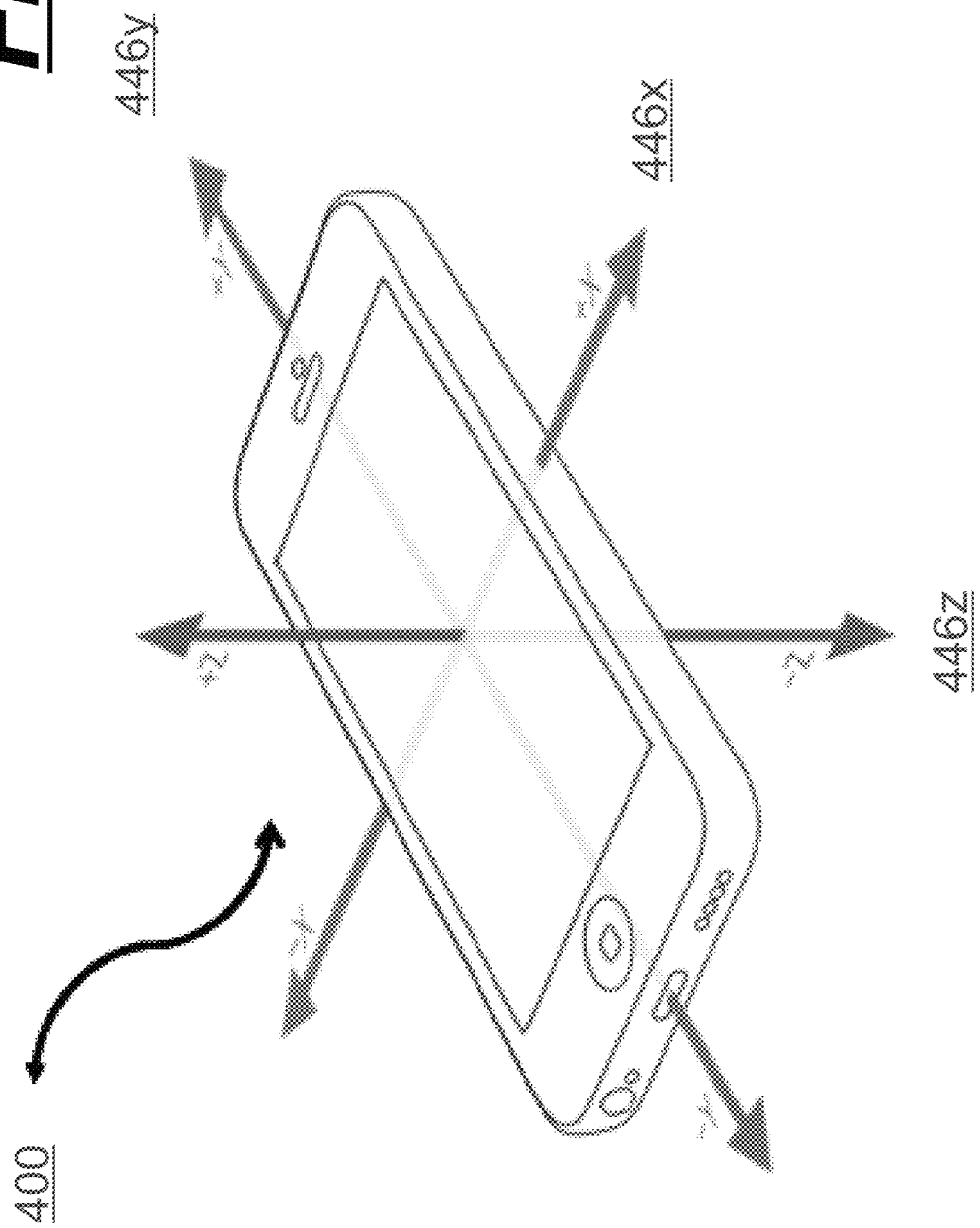

US 10,986,223 B1

SYSTEMS AND METHODS FOR PRESENTING CONTENT BASED ON USER BEHAVIOR

CROSS-REFERENCE TO RELATED APPLICATIONS

This application is a continuation in part of application of U.S. patent application Ser. No. 16/022,467, filed Jun. 28, 2018, which is a continuation of U.S. patent application Ser. No. 15/466,510, filed Mar. 22, 2017, which is a continuation of U.S. patent application Ser. No. 15/466,757, filed Mar. 22, 2017, which in turn claims the benefit of U.S. Provisional Patent Application No. 62/311,461, filed Mar. 22, 2016 and U.S. Provisional Patent Application No. 62/311,644, filed Mar. 22, 2016. This application is also a continuation in part application of U.S. patent application Ser. No. 14/576,809, filed Dec. 19, 2014, which claims the benefit of U.S. Provisional Patent Application No. 61/920,087, filed Dec. 23, 2013. Each of these applications is incorporated by reference in its entirety.

This application is related to U.S. patent application Ser. No. 15/466,617, filed Mar. 22, 2017, U.S. patent application Ser. No. 15/466,410, filed Mar. 22, 2017, U.S. patent application Ser. No. 15/466,445, filed Mar. 22, 2017, each of which is incorporated by reference in its entirety.

FIELD OF THE DISCLOSURE

The present disclosure relates in general to systems and methods for dynamically presenting content to a user based on sensed movements of a user device. The present disclosure also relates to analyzing behavioral patterns of the user.

BACKGROUND

People consume an ever increasing amount of text and other media daily in different environments and various modes including mobile devices such as mobile phones and tablets. The popularity of mobile devices has had some unintended and dangerous consequences when mobile devices are used to consume content by a user that is operating a vehicle. Distracted driving, the term used for driving while engaged in other activities such as texting, talking on the phone, watching media, using a navigation system, reading content is estimated to increase the risk of getting into a crash by as much as three times. As such, numerous efforts have been undertaken to reduce distracted driving and improve highway safety, like adopting laws banning cell phone use while operating a vehicle, employing the use of hands-free aids and using software or connecting devices to vehicle onboard diagnostics to prevent device use while a vehicle is in motion.

Though these and other efforts have attempted to reduce instances of distracted driving, many people, especially young drivers, still continue to engage in distracted driving behaviors. Additionally, some of these techniques are problematic because the voice recognition software used in a hands-free aid may not be very good, resulting in greater distraction of the user when the device doesn't recognize a command or executes an improper command. Additionally when software or onboard diagnostics are used to shut off a device completely, a user is prevented from using aids in the mobile device such as GPS or playing podcasts, audio, music and the like through a mobile device. As such, there is a continuing need to develop techniques to control displayed content on mobile devices, especially when mobile devices are used while operating a vehicle.

Furthermore, conventional user behavior analysis has several technical shortcomings. User behavior analysis is subjective and conjectural, where an observer based upon a limited observation makes a subjective judgement as to the behavioral pattern of the user. Such subjective judgment is inaccurate to be a basis of presenting content or products to the user. Furthermore, the manual observation is cumbersome and inefficient as it may require a human observer to deduce and analyze behavior patterns of a few users.

SUMMARY

What is therefore desired are systems and methods that may display content a user device (e.g., a smartphone) based upon the measurements of one or more sensors of the user device. What is further desired is systems and methods that extract behavioral/usage patterns of the user device based upon the measurements of the one or more sensors.

Embodiments disclosed herein attempt to provide a technical solution to the aforementioned technical problems and may provide other benefits as well. A computer may track the measurements made by one or more sensors (e.g., an accelerometer) and provide a content based upon the measurements. For example, if measurements made by a sensor indicate a sudden decrease in speed of a user device, the computer may change the content presented by the user device such as turning off the audio, pause or stop displayed content, display a blank screen, and/or display a warning message to the user. The sudden decrease in speed may indicate an emergency and the computer may change the content of the user device in response to the emergency. The computer may therefore reduce and/or eliminate distracted driving associated with the use of devices by providing a mechanism to change the display of a device used in a vehicle based on the measurements made by the one or more sensors.

The computer may furthermore analyze the behavioral patterns of the users based upon the measurements of the one or more sensors. The computer may utilize the behavioral patterns to provide a content and/or a product to the user. The computer may further maintain a database for storing behavioral patterns and behavioral models. These behavioral patterns and behavioral models may indicate the user's likelihood of being interested in a content or product. For example, the computer may determine a score that indicates a likelihood that the user will abandon (e.g., not be interested) in the content or the product.

In an embodiment, a computer-implemented method comprises receiving, by a server, sensor data from one or more tracking sensors of a mobile device of a user, wherein the sensor data contains a first and a second set of sensor measurements made continuously by the one or more tracking sensors; determining, by the server, a first behavior representing the first set of sensor measurements; determining, by the server, a second behavior representing the second set of sensor measurements; generating, by the server, behavioral pattern data records based upon the first and second behaviors; calculating, by the server, a first score for the first behavior and a second score for the second behavior; calculating, by the server, a likelihood score associated with a product based on the behavioral pattern data records, wherein the likelihood score is a normalization of the first and second scores; identifying, by the server, a phase associated with the user and the product; and presenting, by the server, customized electronic content for a product for display on a user interface of the mobile device based on the likelihood score and the identified phase, wherein the customized electronic content includes a message to the user and is associated with an image shown by the mobile device.

In another embodiment, a computer-implemented method comprises receiving, by a server, a first set of sensor measurements from an accelerometer and a global positioning sensor of a mobile device associated with a user, sensor measurements from the accelerometer representing jolts and jerks of a vehicle while being driven, and sensor measurements from the global positioning sensor representing one or more locations and directions of travel of the vehicle; generating, by the server, a first driving behavior data record of the user based upon the first set of sensor measurements, the first driving behavior data record indicating that the vehicle is being driven in a stop and go city traffic; receiving, by the server, a second set of sensor measurements from the accelerometer and the global positioning sensor of the mobile device; generating, by the server, a second driving behavior data record of the user based upon the second set of sensor measurements; and in response to the server determining that the second driving behavior data record indicates the vehicle is being driven on a highway: presenting, by the server, a customized electronic content configured to be displayed on the mobile device, the customized electronic content including a link, which when selected causes the mobile device to make a phone call to an entity associated with the customized electronic content.

In yet another embodiment, a system comprises a non-transitory storage medium storing computer program instructions; a processor electrically coupled to the non-transitory storage medium and configured to the execute the computer program instructions to: receive a first set of log files from a mobile device, each log file in the first set of log files including entries of usage of a first set of applications installed in the mobile device in association with corresponding timestamps; generate a first application usage behavior data record of a user based upon the first set of log files; receive a second set of log files from the mobile device, each log file in the second set of log files including entries of usage of a second set of applications installed in the mobile device in association with the corresponding timestamps; generate a second application usage behavior data record of the user based upon the second set of log files; and in response to the processor determining difference between an attribute in the first application usage behavior data record is different from a corresponding attribute in the second application usage behavior data record: present a customized electronic content configured to be displayed on the mobile device, the customized electronic content including wherein the customized electronic content includes a message to the user and is associated with an image shown by the mobile device.

BRIEF DESCRIPTION OF THE DRAWINGS

The present disclosure is here described with reference to embodiments illustrated in the drawings. Other embodiments may be used and/or other changes may be made without departing from the spirit or scope of the present disclosure. The illustrative embodiments described in the brief description are not meant to be limiting of the subject matter presented here.

FIG. 4B shows an illustrative mobile device and three axes along which an accelerometer monitors acceleration data;

DETAILED DESCRIPTION

Figure 1:
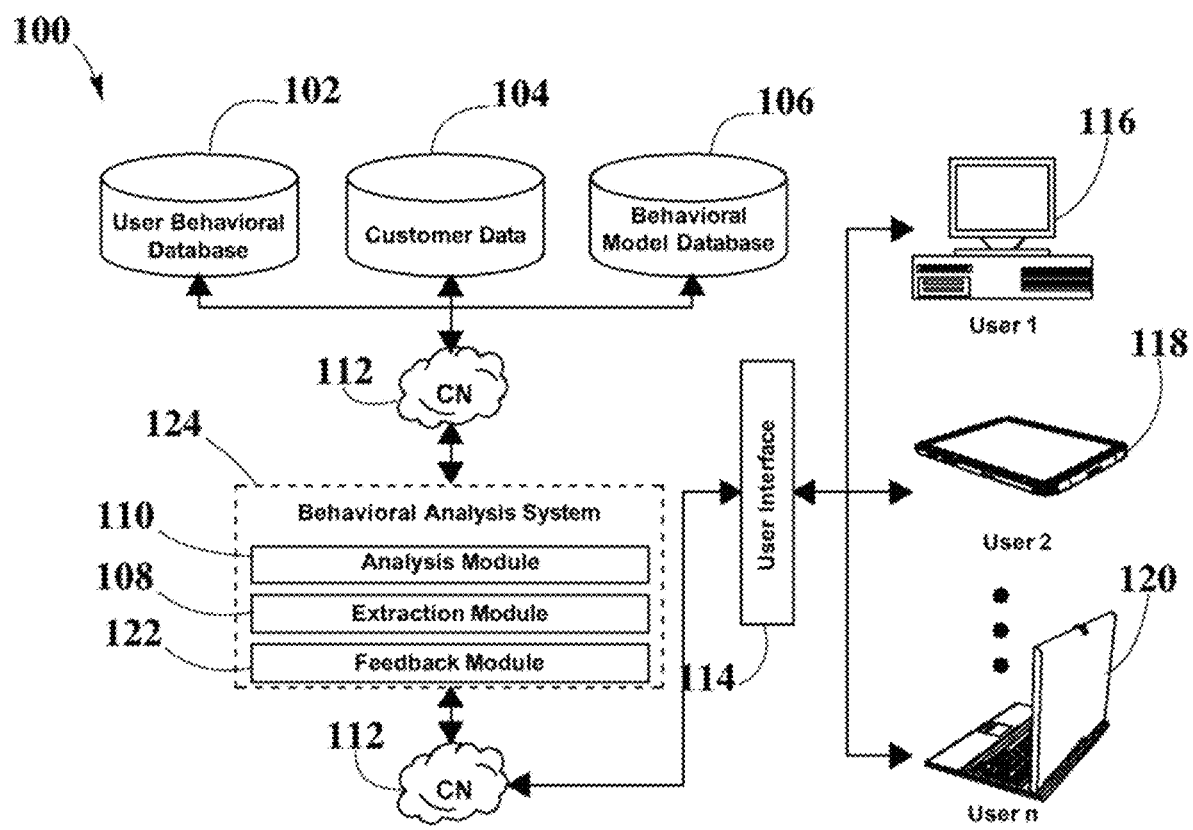
FIG. 1 shows a functional block diagram of an illustrative system architecture for analyzing user behavioral patterns, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Systems and methods for controlling content display are disclosed. The methods may include receiving user input on a device from a user to control presentation of content to the user. The methods may include detecting the user, monitoring the user's movement in relation to device, and generating feedback data. The methods may include providing the feedback data to the device and changing the content displayed to the user. Furthermore, the systems and methods may analyze the behavioral pattern of the user based on the user's interaction with the device and/or the user's movement and behavior detected by the device. Using the behavioral patterns, the systems and method may present a content and/or a product to the user.

The disclosed methods may be implemented by users in interaction with computer systems. In one or more embodiments, the computer systems may include a control device and a content device including a tracking sensor, where the computing devices may communicate using any network infrastructure. Examples of computing devices may include personal computers, tablet devices, and mobile phones, vehicle navigation systems, amongst others. Examples of network infrastructures may include intranets, local area networks (LAN), virtual private networks (VPN), wireless area networks (WAN) and the World Wide Web, amongst others.

FIG. 1 shows a functional block diagram of an illustrative system architecture 100 for analyzing user behavioral patterns, according to an embodiment. According to one embodiment, system architecture 100 includes one or more components, such as, user behavioral database 102, customer data 104, behavioral model database 106, a behavioral analysis system 124, communication networks 112, user interface 114 and client computing devices 116, 118, 120.

User behavioral databases 102 may store user behavioral patterns recorded by one or more user devices during each of the different phases found in a product acquisition process. User behavioral databases 102 may be a database implemented in database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

Customer data 104 may store data from different users that are not related to their t, such as; age, gender, race, where they live, income, education, health issues and all information that may be of relevance for the insurance company. Customer data 104 may be a database also implemented in database management systems (DBMS) such as those previously mentioned.

Behavioral model databases 106 may store behavioral data models that may serve as an indication of the likelihood of a customer to drop from an acquisition (e.g., of a product) during a specific phase. Data feeds to build behavioral models may include behavior of lost customers, behavior of current clients, questions made from clients or/and lost clients, surveys and/or observation from the agent and/or seller, among others. Behavioral models may also be developed using samples from information stored in customer data 104. For example, behavioral models may be determined by analyzing a sample data including behavior information from users that fall within a specific range of ages or education levels. Behavioral model database 106 may be a database also implemented in database management systems (DBMS) such as those previously mentioned.

Behavioral analysis system 124 may be operatively coupled to user behavioral database 102, customer data 104, behavioral model database 106 through communication networks 112, and may include one or more extraction modules 108, one or more analysis modules 110, and one or more feedback modules 122. Each module within behavioral analysis system 124 may be a set of computer instructions executed by central processing units that run computer executable program instructions or related algorithms. Each central processing unit may be a component of computing devices such as a server, a single computer, or multiple computers in a distributed configuration.

Analysis module 110 may be a software module which may compare user behavioral patterns stored in user behavioral databases 102 against user behavioral models stored in behavioral model databases 106 in order to determine the likelihood of a client to drop at each of the different phases. Analysis module 110 may also include programmatic rules or logic to analyze, update or develop new behavioral models. Behavioral models may be updated or developed by comparing a statistical sample information stored in customer data 104 with behavior data captured during the different phases of the acquisition process. For example, in one embodiment, analysis module 110 can develop a behavioral model from information from a group of customers that share a common age range and have displayed a similar behavior during a specific phase of the acquisition process.

Extraction module 108 may be a software module implemented in computing devices, such as desktop computers, laptop computers, server computer among others. Extraction module 108 may include programmatic logic or rules that can automatically identify behavioral patterns of clients during the different phases. For example, in one embodiment video or voice from a customer may be captured using a camera or microphone and analyzed by the extraction module 108 to identify behavioral patterns. In another embodiment, extraction module 108 includes a user interface 114 displayed through display equipment, such as, client computing devices 116, 118, and 120 from where agents can manually record the behavioral patterns of clients through the different phases of acquisitions. In another embodiment, a combination can be used where extraction module 108 automatically captures behavioral patterns from a customer as well as an agent manually records behavioral patterns through user interface 114. A feedback module 122 may be a software module that provides feedback or suggestions to a user on actions that might increase the likelihood of acquisition from a client based on their behavioral patterns.

Components that may be included in system architecture 100 may interact with each other through communication networks 112. Communications networks 112 may include any connection between computing devices, such as intranets, local area networks (LAN), virtual private networks (VPN), wireless area networks (WAN), and The Internet, among others.

Each module within system architecture 100 may be a set of computer instructions executed by central processing units that run computer executable program instructions or related algorithms. Each central processing unit may be a component of computing devices such as a server, a single computer, or multiple computers in a distributed configuration.

Figure 2:
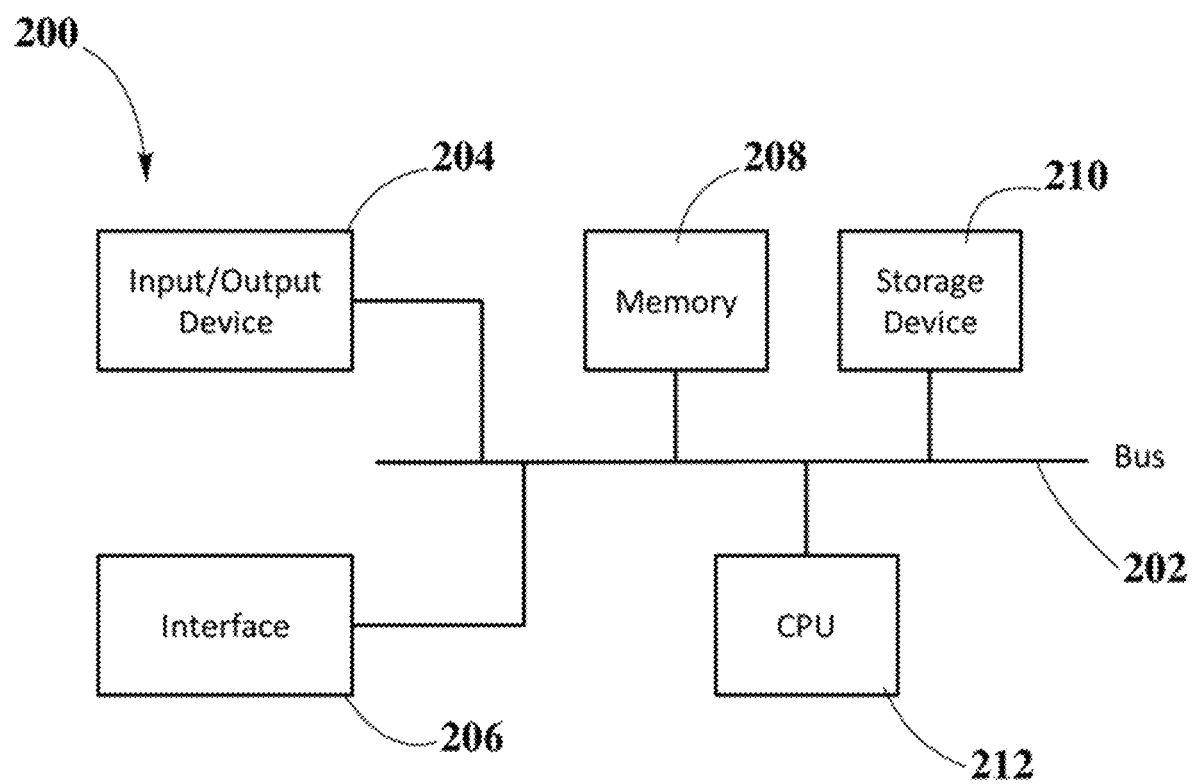
FIG. 2 shows a functional block diagram of an illustrative computing device in which one or more embodiments disclosed herein may operate, according to an embodiment.

FIG. 2 shows a functional block diagram of an illustrative computing device 200 in which one or more embodiments disclosed herein may operate, according to an embodiment. In one embodiment, the computing device 200 includes a bus 202, an input/output (I/O) device 204, a communication interface 206, a memory 208, storage device 210, and a central processing unit 212. In another embodiment, computing device 200 includes additional, fewer, different, or differently arranged components than those illustrated in FIG. 2.

In FIG. 2, bus 202 is in physical communication with the I/O device 204, the communication interface 206, the memory 208, the storage device 210, and the central processing unit 212. The bus 202 includes a path that permits components within the computing device 200 to communicate with each other. Examples of the I/O device 204 include peripherals and/or other mechanisms that may enable a user to input information to the computing device 200, including a keyboard, computer mice, buttons, touch screens, voice recognition, and biometric mechanisms, and the like. The I/O device 204 also includes a mechanism that outputs information to the user of computing device 200, such as, a display, a light emitting diode (LED), a printer, a speaker, and the like.

Examples of the communication interface 206 include mechanisms that enable the computing device 200 to communicate with other computing devices and/or systems through network connections. Examples of network connections include any connections between computers, such as, intranets, LANs, VPNs, WANs, the Internet, and the like. Examples of the memory 208 include RAM, ROM, flash memory, and the like. Examples of the storage device 210 include magnetic and/or optical recording medium, ferroelectric RAM (F-RAM) hard disks, solid-state drives, floppy disks, optical discs, and the like. In one embodiment, the memory 208 and the storage device 210 store information and instructions for execution by the central processing unit 212. In another embodiment, the central processing unit 212 includes a microprocessor, an application specific integrated circuit (ASIC), or a field programmable object array (FPOA), and the like. In this embodiment, the central processing unit 212 interprets and executes instructions retrieved from the memory 208 and/or the storage device 210.

According to some aspects of this embodiment, the computing device 200 is implemented as part of the behavioral analysis system 124, the user behavioral database 102, the customer data 104, the behavioral model database 106, the client computing devices 114, 116, 118, and the like. Examples of these implementations include servers, authorized computing devices, smartphones, desktop computers, laptop computers, tablet computers, a PDAs, another type of processor-controlled device that may receive, process, transmit digital data, and the like. Additionally, the computing device 200 may perform the operations that may be required for the proper operation of system architecture 100. The computing device 200 may perform these operations in response to central processing unit 212 executing software instructions contained in a computer-readable medium, such as the memory 208.

In one embodiment, the software instructions of system are read into the memory 208 from another memory location, such as the storage device 210, or from another computing device 200 (e.g., the user behavioral database 102, the customer data 104, the behavioral model database 106, the behavioral analysis system 124, and the like) via the communication interface 206. In this embodiment, the software instructions contained within the memory 208 instruct the central processing unit 212 to perform processes that will be described in FIG. 7 and FIG. 11 below. Alternatively, hardwired circuitry may be used in place of or in combination with software instructions to implement processes described herein. Thus, implementations described herein are not limited to any specific combination of hardware circuitry and software.

Figure 3:
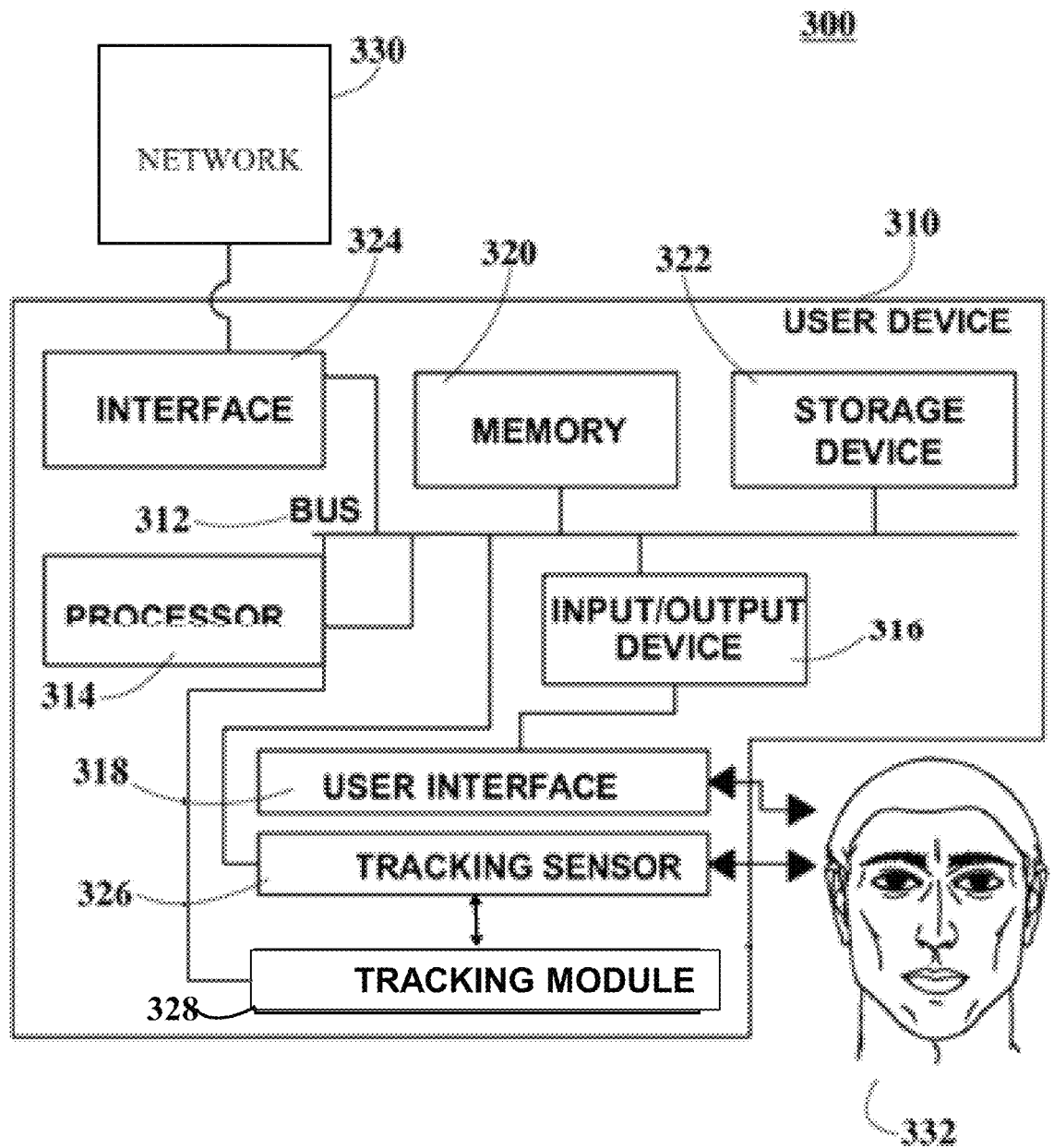
FIG. 3 shows a functional block diagram of an illustrative system architecture for presenting content on a user device, according to an embodiment.

FIG. 3 shows a functional block diagram of an illustrative system architecture 300 for presenting content on a user device, according to an embodiment. The system architecture 300 may include a user device 310, such as a mobile phone or smart phone, tablet, personal digital assistant (PDA), laptop, or other mobile device that includes one or more sensors. The user device 330 may be used by a user 332. The user device 310 further includes a device bus 312, a processor 314, an input/output module 316, a user interface 318, a memory 320, a storage device 322, a user device interface 324, and a tracking sensor 326 (e.g., an eye-tracking sensor). In some embodiments, system architecture 300 can include additional, fewer, or differently arranged components than those illustrated in FIG. 3.

In an embodiment the tracking sensor 326 can include at least one of a head-tracking sensor, an ocular sensor, or an accelerometer. A device 400 as shown in FIG. 4A and discussed in more detail below typically includes other sensors for inputting information such as one or more gyroscopes 447 for detecting rotational movement, a magnetometer 443 for detecting magnetic fields (e.g., for a compass), light sensors 444 (e.g., for a camera), a system for detecting and processing GPS signals 448 (e.g., for determining location and direction of travel), a touch pad 445, and a microphone 442 for detecting sound.

Figure 4A:
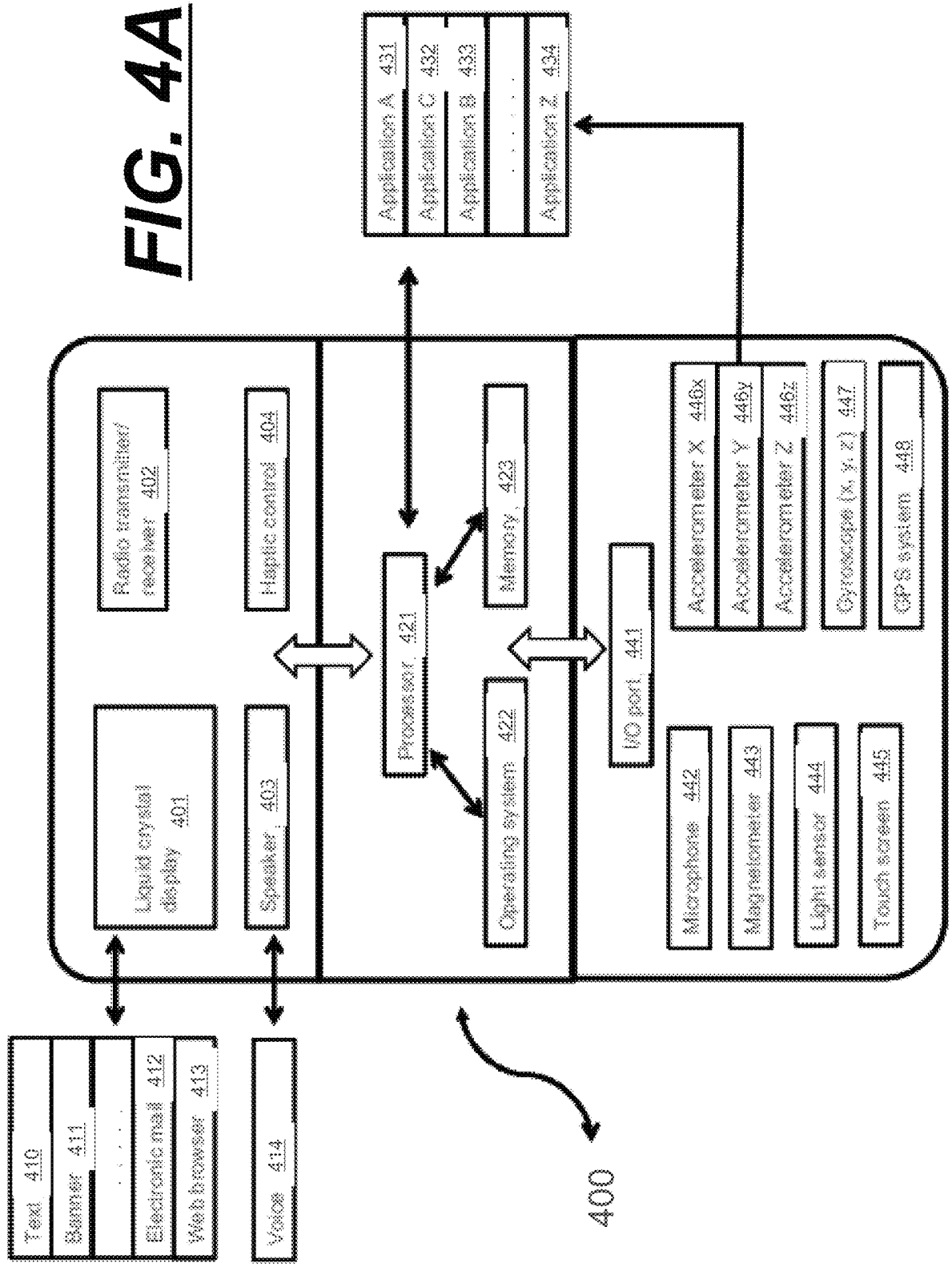
FIG. 4A shows a functional block diagram of an illustrative mobile device configured to present content to a user, according to an exemplary embodiment.

The user device 400 as shown in FIG. 4A also includes bidirectional radio transmitter/receiver 402 that enables the user device 400 to send and receive information wirelessly via a cell tower or wireless router to another device, server, or network (e.g., LAN, WAN, VPN, or WWW, among others). The user 332 may use his or her user device 310 to communicate through any of a number of communication technologies, such as text 410 (e.g., short message service (SMS), multimedia messaging service (MMS)), a banner 411 on the liquid crystal display 401, electronic mail 412, web browser 413, voice or voice mail 414, to name a few. In some cases, the software for operating these functions is installed on the user device 310; in other cases, software may be downloaded or modified by the user of the user device 310.

In particular, the user 332 may personalize the functionality of his or her user device 310, 400 by downloading various mobile applications, e.g., 431, 432, 433, 434, such as mobile applications for banking, life or automobile insurance, podcasts, maps, cell phone or Internet service providers, or shopping networks, to name only a few. When the user 332 downloads an application on the user device 310, 400, it is integrated with the device's existing operating system 422 and other software to perform its intended operations, such as accepting input from a sensor, keypad, accessing the radio transmitter, transmitting and receiving information to and from the Internet, displaying text and video information on the liquid crystal display, providing audio, changing the audio, displayed text and/or video information, and performing other operations. Mobile applications, such as those for banks, insurance companies, Internet or cell phone providers, shopping, and other such applications, generally perform "push" and "pull" capabilities, where a "push" activity is an activity that "pushes" information to the user 332, e.g., sending a message to a mobile device and a "pull" activity is an action that "pulls" information from another source, e.g., sending a request or instructions, accessing account information associated with the mobile application or receiving a confirmation that instructions have been performed.

Returning back to FIG. 3, the user device bus 312 is electronically coupled to and in bi-directional communication with the processor 314, the input/output module 316, the memory 320, the storage device 322, the user device interface 318, the tracking sensor 326 and network interface 324. In these embodiments, the user interface 318 is rendered by the input/output module 316. Further to these embodiments, the user interface 318, and the tracking sensor 326 are configured to interact with user 332 and receive behavioral information from the user 332. In these embodiments, the user device bus 312 includes a path that allows components within user device 310 to communicate with each other.

In some embodiments, the processor 314 is implemented as computing hardware component including a central processing unit able to carry out instructions to perform one or more instructions associated with user device 310. In these embodiments, the processor 314 can include a microprocessor, an ASIC, an FPOA, and the like. Further to these embodiments, processor 314 interprets and executes instructions retrieved from the memory 320 and the storage device 322.

In an example, the processor 314 is configured to interpret and execute instructions associated with the operation of the user device bus 312 (e.g., bus communication system for transferring data between components), the input/output module 316, the user interface 318, and the tracking sensor 326. In these embodiments, the processor 314 is implemented as any computing hardware component including a central processing unit able to execute instructions to perform one or more actions associated with implementing the functionality and/or process instructions for execution on the user device 310. Still further to these embodiments, the processor 314 can include a microprocessor, an ASIC, an FPOA, and the like. In these embodiments, processor 314 interprets and executes instructions retrieved from the memory 320 and/or storage device 322. In an example, the processor 314 is configured to interpret and execute instructions associated with the operation of tracking sensor 326.

In some embodiments, the input/output module 316 is implemented as a computer hardware component that includes peripherals and/or other mechanisms that may enable the user 332 to input information to the user device 310, including keyboards, computer mice, buttons, touch screens, voice recognition, biometric mechanisms, and the like. In these embodiments, the input/output module 316 may be further configured to include one or more mechanisms for outputting information to user 332, such as, for example displays, light emitting diodes (LEDs), printers, speakers, and the like. Further to these embodiments, the input/output module 316 is implemented to include a computer hardware component able to output data to the user 332 via textual and/or graphical content, images, videos, audio, such as a podcast, and the like. In these embodiments, the input/output module 316 is further configured to provide content by rendering the content onto the user interface 318 and to receive input from user 332 via the user interface 318.

In some embodiments, the user interface 318 is implemented as a software module running on associated hardware configured to receive input from the user 332, process the received input into input data, provide the input data to input/output module 316, receive content from input/output module 316, and display content to the user 332. In these embodiments, input data includes user requests to display a desired set of content, user instructions to display supplemental content associated with the display of content, and the like.

In some embodiments the memory 320 is implemented as a computing hardware component that allows the storage and manipulation of data during operations carried out by the processor 314. In an example, the memory 320 allows the storage and manipulation of data during operations associated with user device bus 312, the input/output module 316, the user interface 318, the tracking sensor 326, and the tracking module 328. In these embodiments, the memory 320 is implemented as a computer hardware component that allows the storage and manipulation of data during operations carried out by the processor 314. In an example, the memory 320 allows the storage and manipulation of data during operations associated with the tracking sensor 326, and/or the input/output module 316. Examples of the memory 320 include RAM, Dynamic RAM (DRAM), Static RAM (SRAM), ROM, flash memory, and the like.

In some embodiments, the storage device 322 is implemented as a computer hardware component that allows the storage and retrieval of data associated with running one or more modules and executable versions of the one or more modules and is configured to store information and instructions for execution by the processor 314 to control the associated components within the user device 310. In an example, the storage device 322 is implemented to store and retrieve data associated with one or more of the input/output module 316, the user interface 318, and the tracking sensor 326, for execution by the processor 314 to control the associated components within system architecture 300. In these embodiments, the storage device 322 is implemented as a computer hardware component that allows the storage and retrieval of data associated with running one or more modules and executable versions of the one or more modules and is configured to store information and instructions for execution by processor 314 to control the associated components within the system architecture 300. Examples of storage device 322 include magnetic and/or optical recording media, ferro-electric RAM (F-RAM) hard disks, solid-state drives, floppy disks, optical discs, Electrically Programmable Memories (EPROMs), Electrically Erasable and Programmable Read Only Memories (EEPROMS). and the like.

In other embodiments, user device interface 324 is implemented as computer hardware components configured to allow user device 310 to communicate with other computing devices and/or systems through network connections. Examples of network connections include any suitable connections between computers, such as, for example intranets, LANs, VPNs, WANs, the Internet, and the like. User device interface 324 can be implemented as any suitable interface, such as, network interface controllers, wireless network interface controllers, and the like.

In some embodiments, tracking module 328 is an eye tracking module that is implemented as a software module running on associated hardware, configured to receive command data from the processor 314, process the command data into hardware operation data, and provide the hardware operation data to eye-tracking sensor module 328. In these embodiments, the user device 310 tracks eye movement using the eye-tracking module 328 configured to receive ocular sensor data from the eye-tracking sensor 326, process the ocular sensor data to generate ocular engagement data, and provide the ocular engagement data to the processor 314 for analyzing the content. Further to these embodiments, ocular engagement data includes one or more metrics characterizing the level of engagement of user 332 with content being displayed via user interface 318. In an example, the ocular engagement data includes data describing whether or not the gaze of user 332 is directed toward the content displayed via user interface 318, a general level of interest in the content displayed via user interface 318 as determined by the eye movements of user 332, and the like. In these embodiments, hardware operation data includes instructions for hardware operation, such as instructions to activate eye-tracking sensors, to begin to track the gaze of user 332, to stop tracking the gaze of user 332, and the like.

In some embodiments, the eye tracking sensor 326 is communicatively coupled to the eye tracking module 328. The eye tracking sensor 326 comprises software configured to control associated hardware and configured to receive hardware operation data (e.g., commands and instructions) from the eye-tracking module 328, interact with user 332 in order to generate ocular sensor data, and provide the ocular sensor data to the eye tracking module 328. In these embodiments, ocular sensor data includes data describing the movement of the eyes of user 332 and/or the duration of time the eyes of the user 332 are fixed at the user interface or in a direction away from the user interface. In an example, the eye tracking sensor 326 is implemented as software configured to control camera hardware (e.g., a camera pair, not shown) included within user device 310 that is configured to determine the direction of the gaze of user 332. In this example, ocular sensor data includes the length of stare of user 332 on one or more regions of content being displayed via user interface 318, whether or not user 332 is looking at one or more portions of content being displayed via user interface 318, and the path of the gaze of the user 332 as the user 332 views content being displayed via user interface 318 or gazes in a direction away from the content on the display, such as towards the road.

The eye tracking module 328 may utilize sensor or camera data to determine the gaze of the user 332. In one embodiment, a light (e.g., infrared) is reflected from the user's eye and a video camera or other sensor can receive the corneal reflection. The eye tracking module 328 as shown in analyzes the ocular sensor data to determine eye rotation from a change in the light reflection. A vector between a pupil center and the corneal reflections can be used to compute a gaze direction. Eye movement data may be based upon a saccade and/or a fixation, which may alternate. A fixation is generally maintaining a visual gaze on a single location, and it can be a point between any two saccades. A saccade is generally a simultaneous movement of both eyes between two phases of fixation in the same direction.

In one implementation, the eye tracking module 328 can use a dark-pupil technique, whereby if the illumination source is offset from the optical path, then the pupil appears dark as the retroreflection from the retina is directed away from the camera. In another implementation, the eye tracking module 328 can use a bright-pupil technique, whereby if the illumination is coaxial with the optical path, then the eye acts as a retro reflector as the light reflects off the retina creating a bright pupil effect.

In another embodiment, a camera or sensor can track eye image features (e.g., retinal blood vessels) and follow the features as the eye rotates. It is preferable that the eye tracking data is obtained in a manner that is non-invasive.

In yet another embodiment, a camera or sensor can identify a location of an iris or pupil based on the circular shape or by detection an edge. The movement of the iris or pupil can then be detected.

In some embodiments, the eye tracking module 328 can use a coding system that recognizes eye movement and/or gaze direction and generates a c based on duration and direction. Eye movement or gazing may have a duration of about $\frac{1}{25}$ of a second to 2 seconds or longer, so the eye tracking module 328 may receive a data feed of eye movements from a high speed camera having increments of less than one second to account for very quick changes. Some micro-eye movements occur so quickly that a human observer cannot detect or sense the shift in gaze or eye movement. In one embodiment when at there is at least one of eye movement and/or eye gaze that is directed toward the displayed content, and/or the user device 310, there will be a change in the displayed content and/or information (e.g., audio such as music, directions, a podcast and the like) presented to the user 332. In an exemplary embodiment, the change in the displayed content is that the display will appear blank and no content will be displayed to the user 310. In another example, the displayed content may change to a message directed to the user 332, e.g., "pay attention to the road." In an example, the change in the content presented to the user 310 is that the audio stops or is paused. In another example the change in content presented to the user 310 is an audio message, e.g., "pay attention to the road."

In these embodiments, the change in the displayed content may require a threshold amount of time that a eye-movement or gaze is maintained (e.g., $\frac{1}{25}$ second, $\frac{1}{4}$ second, $\frac{1}{3}$ second, $\frac{1}{2}$ second, 1 second, 2 seconds, 3 seconds, 4 seconds, 5 seconds, 6 seconds, 7 seconds, 8 seconds, 9 seconds, or 10 seconds) before a change to the displayed content is implemented.

In another embodiment when there is at least one of eye movement and/or eye gaze that is directed away from the displayed content, and/or the user device 310, the displayed content and/or information will continue to be displayed to the user 332.

In another embodiment when there is at least one of eye movement and/or eye gaze that is directed away from the displayed content, and/or the user device 310, there will be a change in the displayed content and/or information (e.g., audio such as music, directions, a podcast and the like) presented to the user 310. In an example, the change in the displayed content is what the display will display to the user 310. In an example, the displayed content may be a map or other navigational feature. In an example, the change in the content presented to the user 310 is that the audio begins or resumes play. In an example the audio is music or a podcast.

In these embodiments, the change in the displayed content may require a threshold amount of time that a eye-movement or gaze is maintained (e.g., $\frac{1}{25}$ second, $\frac{1}{4}$ second, $\frac{1}{3}$ second, $\frac{1}{2}$ second, 1 second, 2 seconds, 3 seconds, 4 seconds, 5 seconds, 6 seconds, 7 seconds, 8 seconds, 9 seconds or 10 seconds) before a change to the displayed content is implemented.

In an embodiment that utilizes head tracking, the tracking sensor 326 is a head tracking sensor 326 that is implemented as software configured to control associated hardware and configured to receive hardware operation data from the tracking module 328 implemented as a head-tracking module 328 and interact with user 332 in order to generate head position data, and provide the head position data to head tracking module 328. In these embodiments, the head position data includes data describing the movement of the user's head 332. In an example, the head-tracking sensor module 326 is implemented as software configured to control camera hardware (e.g., a camera pair, not shown) included within the user device 310 that is configured to determine the position of the user's 332 head. In this example, the head position data includes the position of the user's 332 head with respect to one or more regions of content being displayed via the user interface 318, whether or not the user 332 is looking at one or more portions of content being displayed via user interface 318, the path of the head movement user 332 as the user 332 views content being displayed via the user interface 318, and the path of the head movement user 332 as user's head is directed away from content being displayed via the user interface 318.

The head tracking module 328 may utilize sensor or camera data to determine the initial head position of a user and any subsequent change from the initial head position. In one embodiment, a light (e.g., infrared) is reflected from the user's 332 head and a video camera or other sensor can receive the reflection from the user's 332 head. The head tracking module 328 analyzes the head position data to determine head movement from a change in the light reflection. A vector between a location on the user's 332 head and the head reflections can be used to compute a change in head position or direction. Head position data may be based upon a movement and/or a fixation, which may alternate. A fixation is generally maintaining a head position in single location. A movement is generally any change in position of the head from an initial position.

In one implementation, the head tracking module 328 can use a marker technique, whereby if the illumination source is offset from the marker on the user movement is determined.

In another embodiment, a camera or sensor can track head image features (e.g., how much of the head is shown, if only a portion of the head e.g., a cheek or the top of the head) and follow the features as the head rotates or moves. It is preferable that the head tracking data is obtained in a manner that is non-invasive.

In some embodiments, the head tracking module 328 can use a coding system that recognizes head movement, change in position of the head and/or head image features generates a score based on duration of head movement, direction of the head movement and/or head image features. Head movement or position may have a duration of about 1 second, 2 seconds, 3 seconds, 4 seconds, 5 seconds to 10 seconds or longer, so the head tracking module 328 will receive a data feed of head movements from a high speed camera having increments of less than one second to account for very quick changes. In one embodiment when at there is at least one of head movement and/or head position that is directed toward the displayed content, and/or the user device 310, there will be an automatic change in the displayed content and/or information (e.g., audio such as music, directions, a podcast, and the like) presented to the user 332. In an example the change in the displayed content is that the display will appear blank and no content will be displayed to the user 332. In another example, the displayed content may change to a message directed to the user 332, e.g., "pay attention to the road." In an example, the change in the content presented to the user 332 is that the audio stops or is paused. In another example the change in content presented to the user 332 is an audio message, e.g., "pay attention to the road."

In these embodiments, the change in the displayed content may require a threshold amount of time that a head movement or head position is maintained (e.g., 1 second, 2 seconds, 3 seconds, 4 seconds, 5 seconds, 6 seconds, 7 seconds, 8 seconds, 9 seconds, or 10 seconds or longer) before a change to the displayed content is implemented.

In another embodiment when there is at least one of eye movement and/or eye gaze that is directed away from the displayed content, and/or the user device 310, the displayed content and/or information will continue to be displayed to the user 332.

In another embodiment when at there is at least one of head movement and/or head position that is directed away from the displayed content, and/or the user device 310, there will be a change in the displayed content and/or information (e.g., audio such as music, directions, a podcast and the like) presented to the user 310. In an example, the change in the displayed content is that the display will display to the user 310. In an example, the displayed content may be a map or other navigational feature. In an example, the change in the content presented to the user 310 is that the audio begins or resumes play. In an example the audio is music or a podcast.

In these embodiments, the change in the displayed content may require a threshold amount of time that a head movement and/or head position is maintained (e.g., 1 second, 2 seconds, 3 seconds, 4 seconds, 5 seconds, 6 seconds, 7, seconds, 8 seconds, 9 seconds, or 10 seconds or longer) before a change to the displayed content is implemented.

In another embodiment, when there is at least one change in the head image detected by the sensor based upon how much of the head is shown, if only a portion of the head (e.g., a full view of the face, a profile, a cheek, the top, bottom or side of the head) and follow the features as the head rotates or moves.

In these embodiments there will be a change in the displayed content and/or information (e.g., audio such as music, directions, a podcast and the like) presented to the user 332. In an example, the change in the displayed content is that the display will display to the user 332. In an example, the displayed content may be a map or other navigational feature. In an example, the change in the content presented to the user 332 is that the audio begins or resumes play. In an example the audio is music or a podcast.

In these embodiments, the change in the displayed content may require a threshold amount of time that change in the head image detected by the sensor is maintained (e.g., 1 second, 2 seconds, 3 seconds, 4 seconds, 5 seconds, 6 seconds, 7, seconds, 8 seconds, 9 seconds, or 10 seconds or longer) before a change to the displayed content is implemented.

In an embodiment where the tracking sensor 326 includes an accelerometer, the user device 310 may typically have two or three accelerometers, to measure the acceleration along at least one of the orthogonal axes (x, y, z) in physical space. The accelerometers as shown in FIG. 4A are denoted here 446$x$, 446$y$, and 446$z$ for the respective axis along which they are oriented. These three axes for a mobile device 400 are illustrated in FIG. 4B. An accelerometer measures proper acceleration ("g-force"), which is the acceleration of an object relative to gravitational free fall. For example, an accelerometer in free fall will thus detect an acceleration of zero. An accelerometer at rest on earth will measure an acceleration of 9.8 m/s$^2$ upward (equal to the gravitational acceleration (g) of earth) because the accelerometer must experience an upward force of 1G to counteract the downward force of gravity.

Each accelerometer 446$x$, 446$y$, 446$z$ is integrated into the hardware and operating system of the mobile device 400. As shown in FIG. 4A, the smart device 400 includes a processor 421, operating system 422 (such as iOS in the Apple iPhones or Android in certain other smart phones), a memory 423, and software for performing its many functionalities. For example, the processor 421 in the mobile phone 400 receives data from the accelerometers 446$x$, 446$y$, 446$z$, processes that data to determine the orientation of the mobile phone 400, and then determines whether to change the display from portrait to landscape, or vice versa. The accelerometer and other sensor data in the mobile device 400 may be accessed and processed using the Core Motion Framework, a C-based programming language. A CMMotionActivity class, for example, contains the data for a single motion update event, while a CMSensorRecorder class controls the gathering and retrieval of accelerometer data from the mobile device 400. The CMMotionManager class provides both "push" and "pull" access to the motion data on mobile phone 400. To "pull" motion data, the current status of the sensor data or composited data can be accessed as read-only properties of CMMotionManager. To receive "pushed" data, the desired data can be collected with a block or closure that receives updates at a specified interval, which can be programmed (in seconds) using "accelerometerUpdateInterval." For example, a shorter interval for updating accelerometer data may be selected for higher responsiveness or sensitivity, while a longer update interval may be selected to reduce CPU usage. Higher sensitivity may also be accomplished by combining the accelerometer data with data from the gyroscopes 447 or other sensors as well.

In one embodiment, the accelerometers 446 on the mobile phone 400 serve as proxies for monitoring the acceleration experienced by the user (e.g., user 332) of the mobile phone 400, as the user typically leaves her mobile phone 400 turned on at almost all times and typically carries it with her when she travels. In an example, if the user 332 swerves to avoid a deer or other obstacle, or abruptly slows down to avoid a collision, begins to speed up indicating that a vehicle is being operated, or maintains a constant speed, the change or no change in acceleration or deceleration will be recorded by the accelerometers 446 in the mobile phone 400.

In one embodiment when there is at least one of increase or decrease in acceleration there will be an automatic change in the displayed content and/or information (e.g., audio such as music, directions, a podcast and the like) presented to the user 332. In an example the change in the displayed content is that the display will appear blank and no content will be displayed to the user 332. In another example, the displayed content may change to a message directed to the user 332, e.g., "pay attention to the road." In an example, the change in the content presented to the user 332 is that the audio stops or is paused. In another example the change in content presented to the user 332 is an audio message, e.g., "pay attention to the road."

In these embodiments, the change in content may require a threshold amount of time that acceleration or deceleration occurs (e.g., ⅕ second, ¼ second, ⅓ second, ½ second, 1 second, 2 seconds, 3 seconds, 4 seconds, 5 seconds, 6 seconds, 7, seconds, 8 seconds, 9 seconds or 10 seconds or more) before a change to the displayed content is implemented.

In another embodiment, when at least one accelerometer 446 detects that there is no movement or the movement is at a consistent speed (e.g., no abrupt stops or accelerations), the displayed content and/or information will continue to be displayed to the user 332.

In another embodiment, when at least one accelerometer 446 detects that there is no movement or the movement is at a consistent speed (e.g., no abrupt stops or accelerations) there will be an automatic change in the displayed content and/or information (e.g., audio such as music, directions, a podcast and the like) presented to the user 332. In an example, the change in the displayed content is that the display will display content to the user 332. In an example, the displayed content may be a map or other navigational feature. In an example, the change in the content presented to the user 332 is that the audio begins or resumes play. In an example the audio is music or a podcast.

In these embodiments, the change in the displayed content may require a threshold amount of time that the accelerometer detects that there is no movement or the movement is at a consistent speed (e.g., no abrupt stops or accelerations) (e.g., 1 minute 2 minutes, 3 minutes, 4 minutes, 5 minutes 6 minutes, 7 minutes, 8 minutes, 9 minutes or 10 minutes or more) before a change to the displayed content is implemented.

Further to these embodiments, the tracking sensor 326 include one or more accelerometers (e.g., accelerometers 446) configured to measure the acceleration along at least one of the orthogonal axes (x, y, z) in physical space. In these embodiments, a accelerometer measures proper acceleration ("g-force"), which is the acceleration of an object relative to gravitational free fall. For example, an accelerometer in free fall will thus detect an acceleration of zero. In another embodiment, the processor 314 monitors the acceleration data only when the speed of the user device 310, as determined by the rate of change of position as determined with the GPS system, exceeds a certain minimum, such as 5 mph. In this embodiment, the processor 314 can dynamically monitor the effective speed of the vehicle by determining the change in location of the user device 310 at regular intervals. In this embodiment the processor 314 compares the distance the vehicle has traveled during a predetermined interval (e.g., its speed) and compares that distance (or speed) to a predetermined threshold. If the processor 314 determines the user device 310 is traveling faster than the predetermined speed threshold, the processor 314 may automatically begin to continuously collect or monitor the acceleration data of the user device 310 using the tracking sensor 326, change the display content, or both. If the processor 314 determines the user device 310 is traveling more slowly than the predetermined speed threshold, the processor 314 will not monitor or collect the acceleration data, resume the display content, do nothing, or both. In another embodiment, the processor 314 can continuously collect or monitor user behavior data using the tracking sensor 326 and a signal is sent when the behavior of the user device 310 indicates the user 332 is no longer distracted or is not distracted for an unsafe time period. In an embodiment, when the behavior of the user device 310 indicates that the user 332 is no longer distracted or is not distracted for an unsafe time period, the display continues or resumes the display of content on the display and/or transmission of sound.

As described above, FIG. 4A shows a functional block diagram of an illustrative mobile device 400 configured to present content to a user, according to an exemplary embodiment. The mobile device 400 may be a smart phone, tablet, personal digital assistant (PDA), laptop, or any other type mobile device that includes one or more sensors. For purposes of illustration only and not limitation, the mobile device 400 includes at least one accelerometer 446, and typically two or three accelerometers, to measure the acceleration along at least one of the orthogonal axes (x, y, z) in physical space. The accelerometers are denoted here 446$x$, 446$y$, and 446$z$ for the respective axis along which they are oriented. These three axes for the mobile device 400 are illustrated in FIG. 4A. An accelerometer measures proper acceleration ("g-force"), which is the acceleration of an object relative to gravitational free fall. For example, an accelerometer in free fall will thus detect an acceleration of zero. An accelerometer at rest on earth will measure an acceleration of 9.8 m/s$^2$ upward (equal to the gravitational acceleration (g) of earth) because the accelerometer must experience an upward force of 1G to counteract the downward force of gravity. The mobile device 400 typically includes other sensors for inputting information, such as one or more gyroscopes 447 for detecting rotational movement, a magnetometer 443 for detecting magnetic fields (e.g., for the compass), light sensors 444 (e.g., for the camera), a system for detecting and processing GPS signals 448 (e.g., for determining location and direction of travel), a touch pad 445, and a microphone 442 for detecting sound.

Each accelerometer 446$x$, 446$y$, 446$z$ is integrated into the hardware and operating system of the mobile device 400. The mobile device 400 includes a processor 421, operating system 422 (such as iOS in the Apple iPhones or Android in certain other smart phones), memory 423, and software for performing its many functionalities. For example, the processor 421 in the mobile device 400 receives data from the accelerometers 446$x$, 446$y$, 446$z$, processes that data to determine the orientation of the device, and then determines whether to change the display from portrait to landscape, or vice versa. The accelerometer and other sensor data in the mobile phone 400 may be accessed and processed using the Core Motion Framework, a C-based programming language.

In some embodiment user interface 318 is implemented as a software module running on associated hardware configured to receive input from user 332, process the received input into input data, provide the input data to input/output module 316, receive content from input/output module 316, and display content to user 332. In these embodiments, input data includes user requests to display a desired set of content, user instructions to display supplemental content associated with the display of content, and the like.

In some embodiments, tracking sensor 326 is an eye-tracking sensor implemented as a computer hardware component configured to track the gaze of user 332. In these embodiments, eye-tracking sensor 326 can be implemented as an optical tracking device, such as an infrared emitter and camera, a video camera, and the like. In an example and referring to FIG. 3, eye-tracking sensor 326 is configured to be controlled by eye-tracking module 328. Further to these embodiments the tracking sensor 326 is a head-tracking sensor which is implemented as software configured to track the position of the user's head. In these embodiments, head-tracking-sensor 326 can be implemented as a physical tracking devices, such as an infrared emitter and camera, a video camera and the like. In an example and referring to FIG. 1, head-tracking sensor 126 is configured to be controlled by head-tracking module 128.

Figure 5:
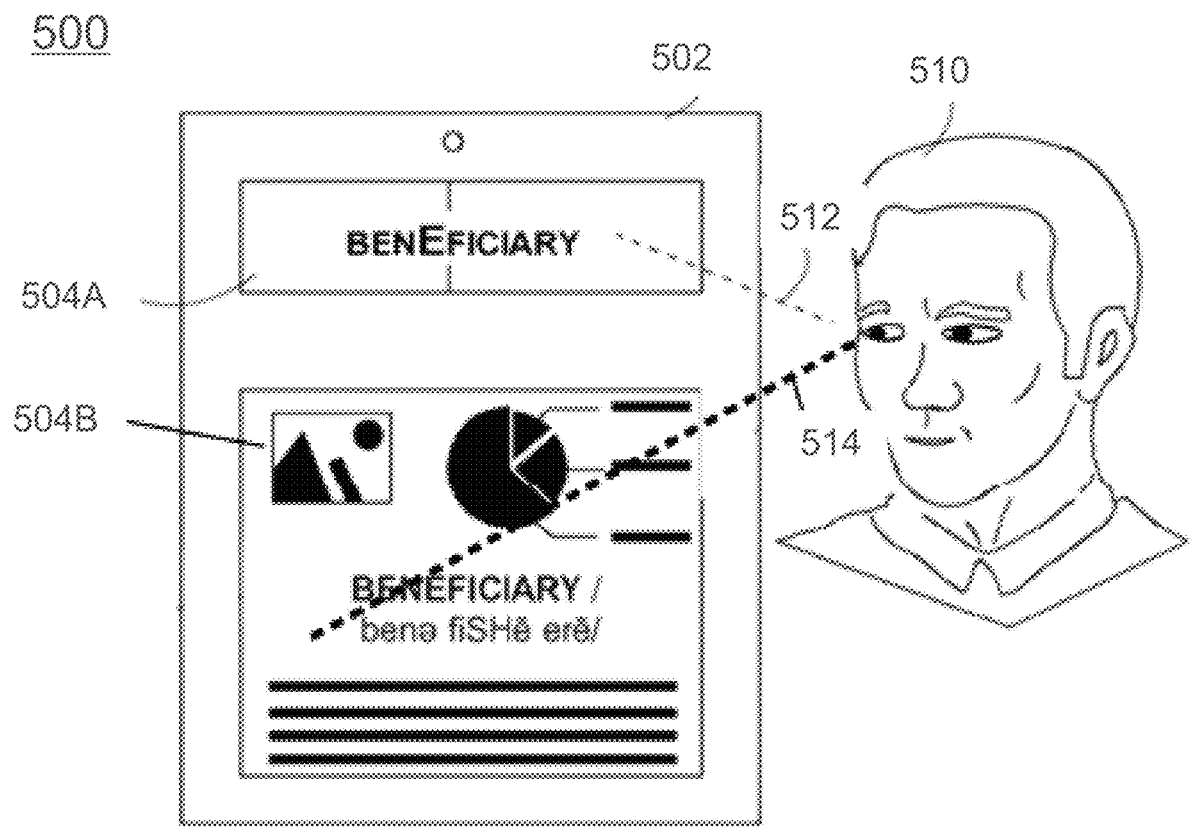
FIG. 5 shows an illustrative content display use case, according to an embodiment.

FIG. 5 shows an illustrative content display use case 500, according to an embodiment. The use case 500 includes a user device 502 and user 510. The user device 502 includes content display 504*a* and 504*b*. Additionally, user device 502 can include audio content consumed via a speaker coupled to the device and/or a sound system coupled to the user device 502. In some embodiments, the gaze of user 510 can be characterized by first gaze line 512 and second gaze line 514. Use case 500 can include additional, fewer, or differently arranged components than those illustrated in FIG. 5.

In some embodiments, user device 502 is implemented as a user computing device configured to generate by a processing module content data configured for presentation on a display of the user computing device, transmit the content data to one of the display of the user computing device for display on the user computing device, to a speaker of the user computing device for audio transmission, or both and collect behavior data of the user sensed by the tracking sensor. In these embodiments, the processing module of the user computing device determines whether behavior data represents a value that satisfies a threshold value and when the value satisfies the threshold value, generate a change in the content data presented on at least one of the display of the user computing device, the speaker of the user computing device, or both. In these embodiments when the value does not satisfy the threshold value the same content data on at least one of least one of the display of the user computing device is displayed, the speaker of the user computing device transmits sound, or both.

The user device 502 may be configured in a manner similar to user device 310 in FIG. 3. In these embodiments, content display 504A, 504B is implemented on the user interface associated with the user device 502 and configured to display content or transmit sound. Further to these embodiments, the content display 504A, 504B is changed when the user gaze or head movement is directed towards the content. In an example this is represented by gaze line 512 or gaze line 514. In an embodiment, the content displayed on the screen changes when the user gaze or head movement is directed towards the content and a threshold value is met. In another embodiment the content display 504A, 504B is changed when the accelerometer detects a sudden increase in speed, a sudden decrease in speed or a constant speed.

In operation, user device 502 displays content. In some embodiments, user device 502 monitors the behavior of user 510 in order to generate behavioral data. In an example, tracking sensor module controls tracking sensor and begins to track the movements of the user 510 in order to generate behavioral data, and receives the generated sensor data from tracking sensor module. In some embodiments, user device 502 changes the content displayed on the display and/or transmitted via audio based on the behavioral data. Further to this embodiment, behavioral data is the gaze of user 510 which is characterized by a gaze in the direction of the device display, e.g., gaze line 512 or gaze line 514. Further to this embodiment, the content on the display is changed when the behavioral data meets at threshold value.

Figure 6A:
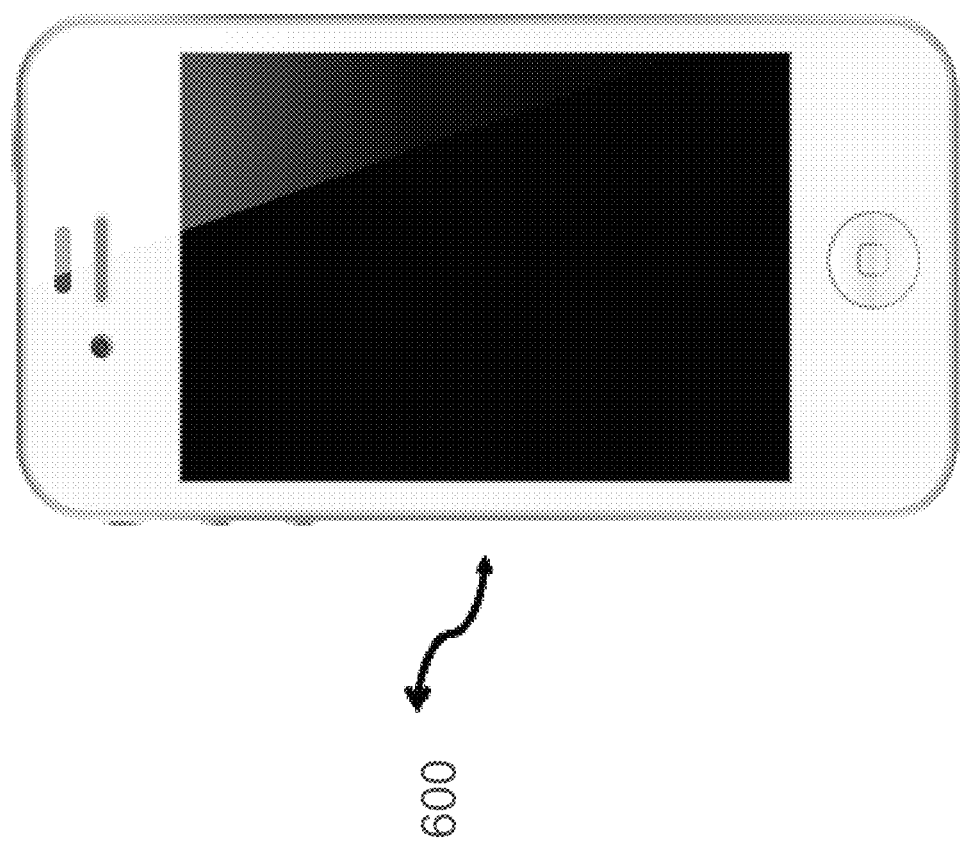
FIG. 6A shows an illustrative content display device, according to an embodiment.
Figure 6B:
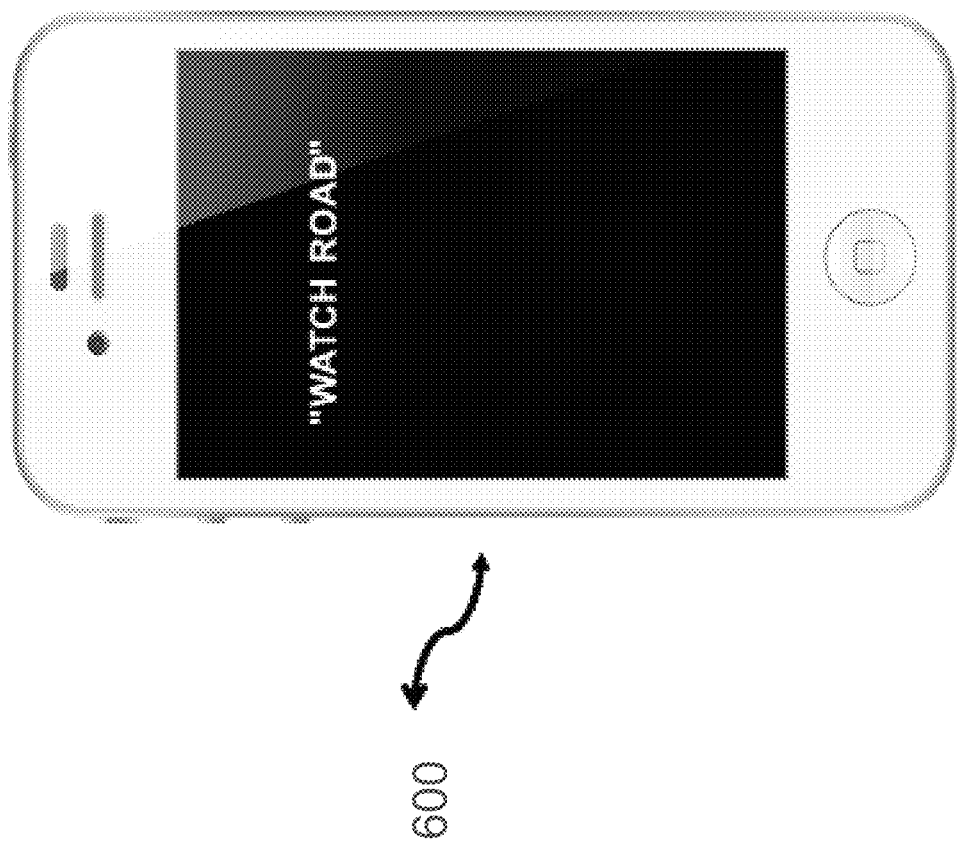
FIG. 6B shows an illustrative content display device, according to an embodiment.

In an embodiment, the behavioral data can be assigned a value, which can represent an amount of time that the user's 510 gaze is directed toward the display or away from the display. For example, if the user 510 is gazing at an item for more than one second, the user may not be focusing on another task such as looking at the road while driving. In another example, if the user 510 is gazing away from the user interface for more than one second, the user 510 may be focusing on another task, such as looking at the road while driving, answer a phone or engaging in a conversation. In the exemplary embodiment, the threshold value is set at four seconds, but any time period can be used. When the gaze is directed towards the display and the value is above this threshold value, the system can automatically change the content displayed to the user 510, e.g., turn off audio, pause or stop displayed content, display a blank screen or display a message to the user (as shown in FIGS. 6A and 6B). When detecting whether a user's 510 eyes are directed away from the device display, a different threshold value can be used, which can be established at 4 seconds, 5 seconds, 6 seconds, 7 seconds, 8 seconds or more when this threshold value is met the content can automatically resume.

In an embodiment, the behavioral data can be assigned a value, which can represent an amount of time that the user's 510 face is directed toward the display or away from the display and/or if the amount of the face and or head of the user 510 detected by the sensor changes. For example, if the user 510 is gazing at the display the full head of the user may be detected as facing the display by the sensor, if only a portion of the face or head is detected by the user 510 e.g., ¼ of the face, or ½ of the face, or ¾ of the face, the user 510 may still be viewing the display, either out of the corner of their eye or by glancing at the display. In either case, the user 510 may not be focusing on another task such as looking at the road while driving. In another example, if the user's 510 face is directed away from the display and/or the amount of the face and or head directed toward the display changes, the user 510 may be focusing on another task, such as looking at the road while driving, answering a phone or engaging in a conversation. In the exemplary embodiment, the change in the amount of the user's 510 head and/or face detected by the sensor can cause a change in the content displayed to the user 510. In another embodiment, the change in content can occur when the change in the amount of the user's 510 head and/or face detected by the sensor meets a threshold value, e.g., four seconds (but any time period can be used.) When the full face of the user 510 is detected by the sensor and the value is above this threshold value, the system can automatically change the content displayed to the user 510, e.g., turn off audio, pause or stop displayed content, display a blank screen or display a message to the user 510. When a portion of the face or head facing the display is detected by the tracking sensor meets a predetermined threshold amount, e.g., more than or equal to e.g., ¼ of the face or head facing the display, ½ of the face or head facing the display, ¾ of the face or head facing the display, or the full face or head facing the display, the system can determine that enough head movement has been detected from the system to automatically change the content displayed to the user 510, e.g., turn off audio, pause or stop displayed content, display a blank screen or display a message to the user 510. When the user's 510 face or head is directed away from the display and/or the amount of the face and or head directed toward or facing the display changes to below the predetermined threshold amount so that only a profile of the user 510 is captured, the system can automatically change the content displayed to the user 510, e.g., resume audio and/or display content. When detecting whether a user's 510 eyes are directed away from the device display, a different threshold value can be used, which can be established at 4 seconds, 5 seconds, 6 seconds, 7 seconds, 8 seconds or more when this threshold value is met the content and/or audio can automatically resume.

In some embodiments, content display 504A, 504B can be automatically changed when the accelerometer detects a sudden increase in speed, a sudden decrease in speed or a constant speed user device 502. In these embodiments, the system can change the content displayed to the user 510, e.g., turn off audio, pause or stop displayed content, display a blank screen or display a message to the user when there is an increase in acceleration and a threshold value is met and/or when there is a decrease in acceleration and a threshold value is met. When detecting that the acceleration is constant and a threshold value is met, the content and/or audio can resume.

FIGS. 6A and 6B shows illustrative content display device 600 with illustrative changes in the display. In FIG. 6A, the screen display goes blank. In FIG. 6B, the screen displays a message. Alternatively, the device 600 can play an audio file with a message, such as "watch road."

Figure 7:
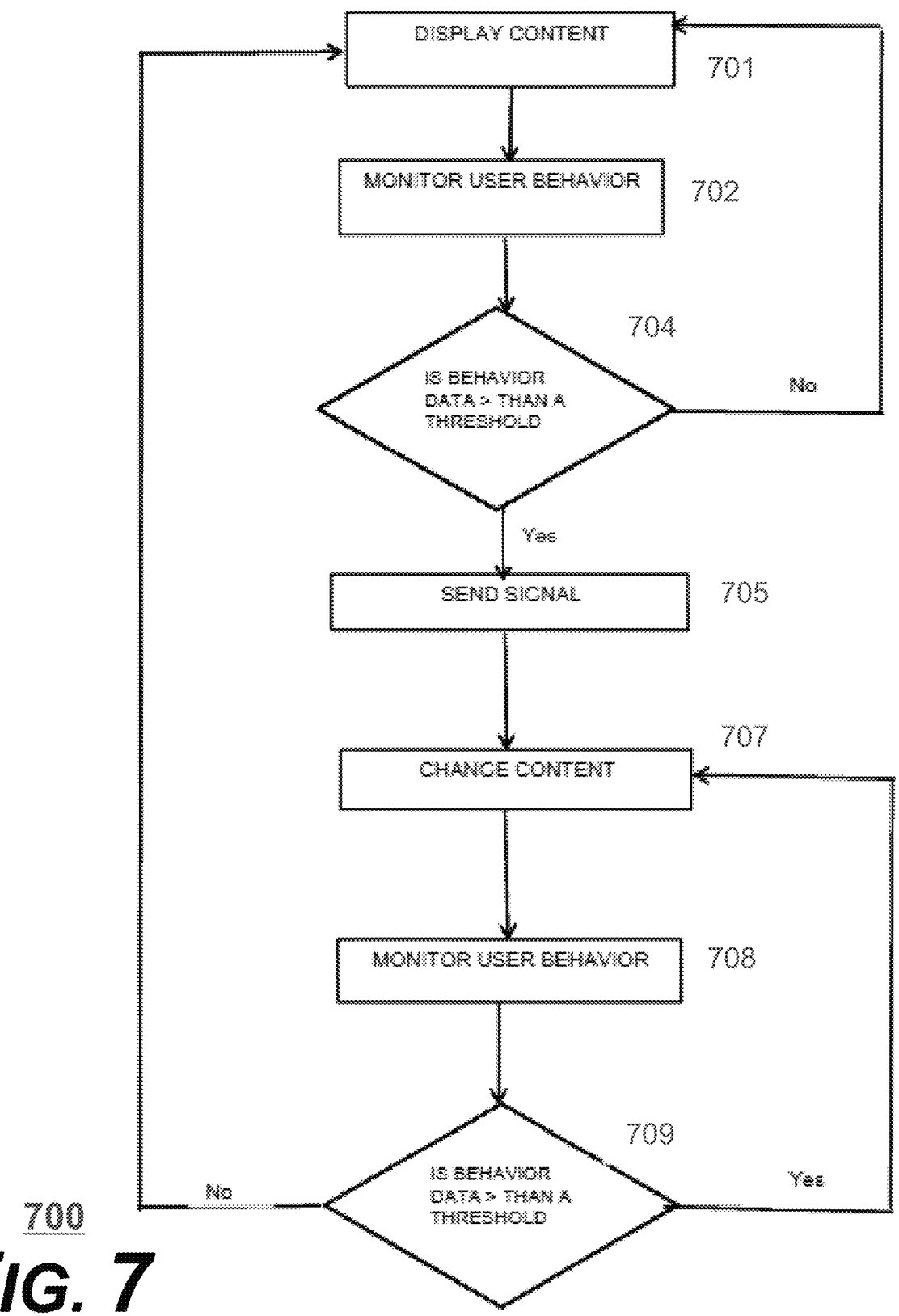
FIG. 7 shows a flowchart of an illustrative method for controlling content display according to an embodiment.

FIG. 7 shows a flowchart of an illustrative method 700 of controlling content display, according to an embodiment. In some embodiments, the method 700 includes additional or fewer steps than those depicted in FIG. 7. In these embodiments, one or more steps may be performed in parallel or in a sequence different from that depicted in FIG. 7. The method 700 begins with step 701.

In step 701, the display of the user device displays content, transmits sound, or both to a user. In an embodiment the content can be a map, a podcast, streaming music and the like. Step 701 continues to step 702.

In step 702, the behavioral data of the user is monitored by a sensor and sent to the processor. In one embodiment, the processor is continually monitoring the behavior data, but this type of continual monitoring may be unnecessary given the user is not always traveling in a vehicle or in an environment where a distraction could occur. Continual monitoring according to the invention may also tie up processing power and shorten battery life. In another embodiment (not shown), the processor monitors the behavior data only when the speed of the device, as determined by the rate of change of position as determined with the GPS system, exceeds a certain minimum, such as 5 mph according to known methods in the art. In this embodiment, if the processor determines the device is traveling faster than the predetermined speed threshold, the processor will begin monitoring the behavior data as described above. If the processor determines the device is traveling more slowly than the predetermined speed threshold, the processor will not monitor the behavior data. This will limit application of the invention to those periods of time when the user is mostly likely to be carrying his or her smart phone while traveling in a vehicle.

In step 704, the processor compares the behavior data to a predetermined threshold. For example, in an embodiment, the behavior data is behavior extracted from the user captured using a head-tracking sensor which extracts information about the user's head movement and duration of the head movement in a direction within a boundary associated with one or more portions of the content. When the user's head movement is directed to a boundary associated with at least a portion of the content, the threshold value that the head movement is maintained can be about 1 second, 2 seconds, 3 seconds, or 4 seconds. In another exemplary embodiment, the behavior data is behavior extracted from the user using an eye-tracking sensor which extracts information about the user's eye movement and duration of the users gaze within a boundary associated with one or more portions of the content. In this embodiment when the user's gaze is in a direction of a boundary associated with at least a portion of the content, the threshold value that the gaze is maintained can be about 500 ms, 1 second, 2 seconds, 3 seconds, 4 seconds or 5 seconds. In another embodiment, the predetermined threshold can be the image captured by the head-tracking sensor. For example, if the image capture of the head is a 100% of the face, ¾ (75%) of the face, or ½ (50%) of the face the threshold value is met. In an exemplary embodiment, this predetermined threshold may be fixed and programmed into a mobile application. In another embodiment, not shown, the predetermined threshold value may be determined by the user's behavior data history. For example, the processor may record certain head images, head movements and/or eye movement sensed by the device over a period of time, and then prepare a statistical analysis to identify the range of images or movements values most commonly experienced by the device, and presumably by its user as well. The processor would use this range of values to determine the appropriate behavioral threshold. To avoid consuming excessive processing power, the application may be programmed to perform this type of analysis periodically, e.g., once a day, or week, or month, as appropriate.

If the processor in step 704 determines the behavior data is below the predetermined threshold, the processor continues monitoring the behavior data but takes no further action, e.g., the content on the display will continued to be display, the audio will continue to be transmitted, or both. If, however, the processor in step 704 determines the behavior data exceeds the predetermined threshold value, then the process proceeds to step 705.

In step 705, the processor transmits a signal to an application and/or processor. This signal in other words, is sent when the user of the device's behavior occurs for a period of time that may mean the user is distracted for a value of time that is unsafe. In an exemplary embodiment, gazing at the display, a facial image that is interpreted to mean the user is gazing at the display and not in another direction, e.g., the road, will trigger the transmission of a signal to the application and/or processor. Step 705 proceeds to step 707.

In step 707, the processor and/or application responds to the signal by changing the content displayed. In an embodiment, where the user of the device's behavior indicates that the user is distracted, the display appears blank, a brief message appears on the display and/or the audio is not transmitted. Step 707 proceeds to step 708.

In step 708, the behavioral data of the user is monitored by a sensor and sent to the processor. In one embodiment, the processor is continually monitoring the behavior data, but this type of continual monitoring may be unnecessary given the user is not always traveling in a vehicle or in an environment where a distraction could occur. Continual monitoring according to the invention may also tie up processing power and shorten battery life. In step 708, the processor compares the behavior data to a predetermined threshold. For example, in an embodiment, the behavior data is behavior extracted from the user captured using a head-tracking sensor which extracts information about the user's head movement and duration of the head movement in a direction within a boundary associated with one or more portions of the content. When the user's head movement is directed to a boundary associated with at least a portion of the content, the threshold value that the head movement is maintained can be about 1 second, 2 seconds, 3 seconds, or 4 seconds. In another exemplary embodiment, the behavior data is behavior extracted from the user using an eye-tracking sensor which extracts information about the user's eye movement and duration of the users gaze within a boundary associated with one or more portions of the content. In this embodiment when the user's gaze is in a direction of a boundary associated with at least a portion of the content, the threshold value that the gaze is maintained can be about 500 ms, 1 second, 2 seconds, 3 seconds, 4 seconds or 5 seconds. In another embodiment, the predetermined threshold can be the image captured by the head-tracking sensor. For example, if the image capture of the head is a 100% of the face, ¾ (75%) of the face, or ½ (50%) of the face, the threshold value is met. In an exemplary embodiment, this predetermined threshold may be fixed and programmed into a mobile application. In another embodiment, the behavior data is acceleration data. For example, a smart phone that is dropped and bounces off the floor may detect an acceleration of approximately 2Gs along one or more axes. When a driver makes a sudden stop, as when she seeks to avoid a collision, the accelerometer in the smart phone she is carrying may register approximately 4Gs or more. Thus, in an exemplary embodiment, an acceleration threshold of 3G may be an appropriate threshold for determining whether the user of the smart phone has experienced an unusually strong or rapid acceleration or deceleration in an automobile. This threshold is intended to avoid false positives, which may be generated by random mishaps (e.g., dropping the smart phone) or which are not strong enough to indicate that the user has experienced or nearly avoided a serious incident in an automobile. In another embodiment, an acceleration threshold above 2G but below 2.5G may indicate the mobile device has been dropped but was not traveling in an automobile that experienced an unusually rapid deceleration. In another embodiment, not shown, the predetermined threshold value may be determined by the user's behavior data history. For example, the processor may record certain head images, head movements and/or eye movement sensed by the device over a period of time, and then prepare a statistical analysis to identify the range of images or movements values most commonly experienced by the device, and presumably by its user as well. The processor would use this range of values to determine the appropriate behavioral threshold. To avoid consuming excessive processing power, the application may be programmed to perform this type of analysis periodically, e.g., once a day, or week, or month, as appropriate. Step 608 proceeds to step 609.

In step 609, if the processor determines the behavior data is below the predetermined threshold, the process continues to step 601. If, however, the processor in step 609 determines the behavior data exceeds the predetermined threshold value, then the process proceeds to step 607.

Figure 8:
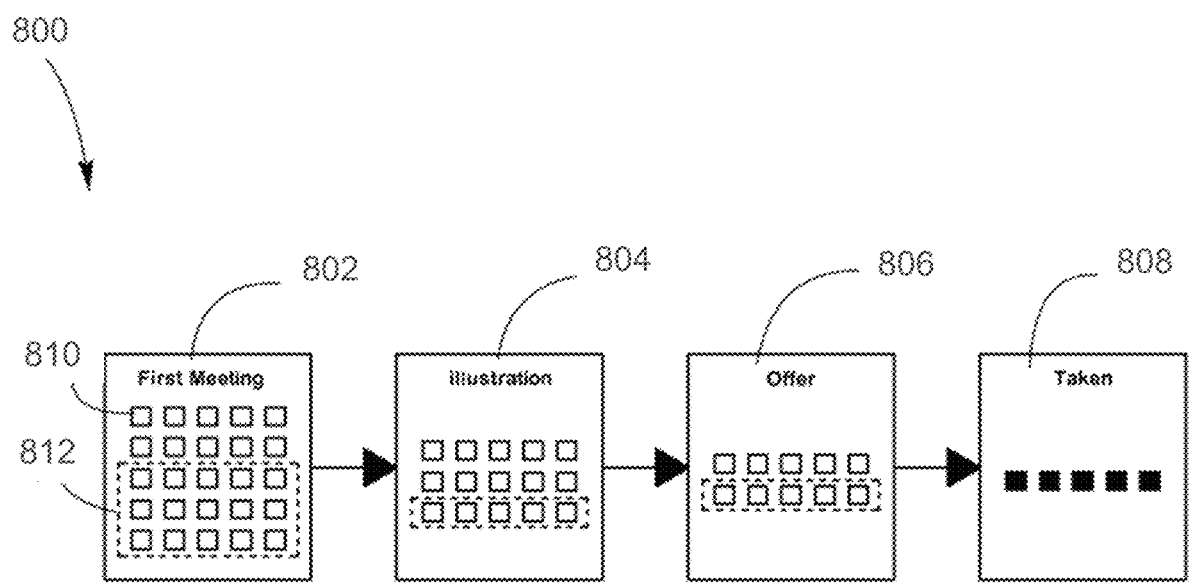
FIG. 8 shows an illustrative data acquisition process, according to an embodiment.

FIG. 8 shows an illustrative data acquisition process 800, according to an embodiment. The data acquisition process 800 may be aided by sensor data (or sensor measurement) collected by one or more sensors of a user device. The process 800 includes phases involved in the contracting and/or product acquisition process that may include for example, first meeting 802, illustration 804, offer 806, and accepted 808. During the first meeting 802 phase, agents and/or sellers may first contact customers 810 interested in acquiring a product. During each of the different phases some customers become lost customers 812 for different reasons. During the illustration 804 phase, the agent and/or seller may present advantages, benefits and terms of the different services and/or products offered. At the offer 806 phase, customers 810 may receive a proposal for a product that may satisfy the needs and/or wishes of customers 810. Finally, at the accepted 808 phase, customers 810 may accept the proposal. The phases illustrated in FIG. 8 are exemplary and the data acquisition process 800 may include different, additional or fewer phases than the ones illustrated. Behavior data from the different phases is captured and stored by an extraction module in a behavioral database such as the one described in FIG. 1 and captured by devices described in FIGS. 3, 4A, 4B, 5, 6A, 6B. The behavior data of customers 814 and lost customers 812 can be analyzed by an analysis module in order to derive or update behavioral models that can predict the likelihood of a customer to drop from an acquisition during a specific phase.

Figure 9:
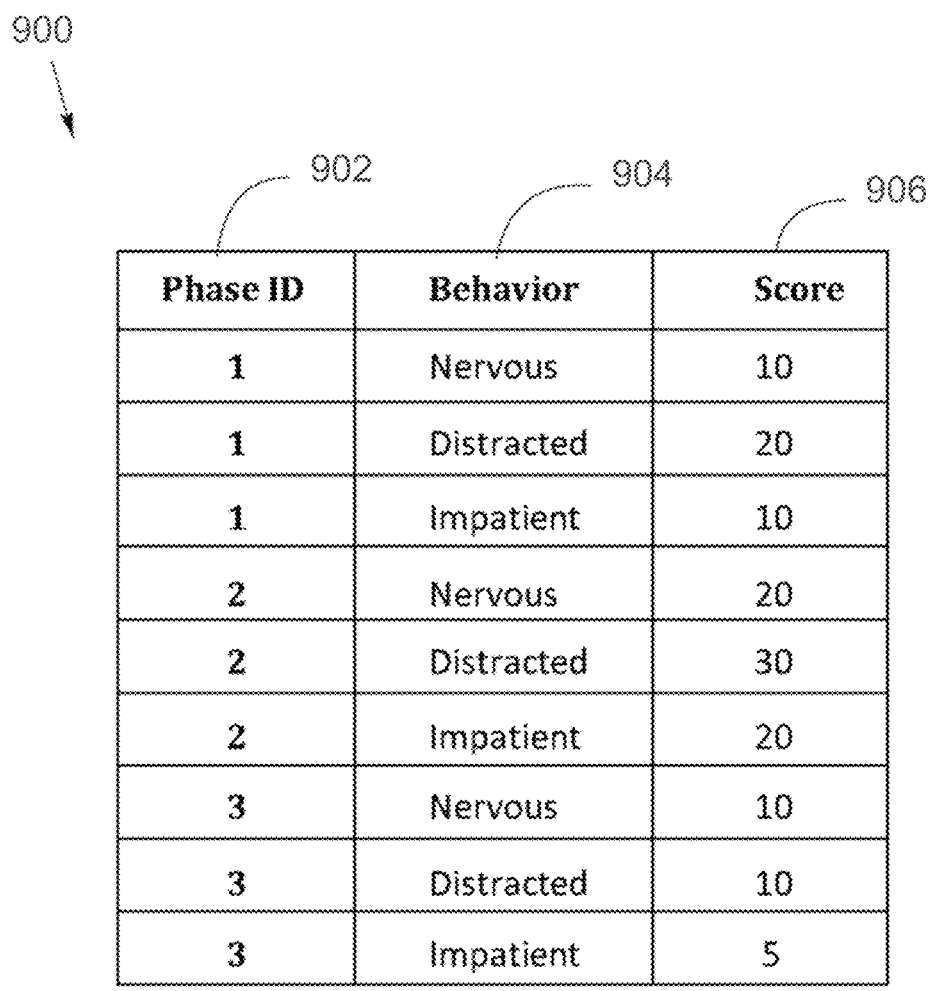
FIG. 9 shows an illustrative behavioral model, according to an embodiment.

FIG. 9 shows an illustrative behavioral model 900, according to an embodiment. A computer may generate the behavioral mode 900 based on sensor data (or sensor measurement) by one or more of the devices described in FIGS. 3, 4A, 4B, 5, 6A, 6B. As shown in FIG. 9, the behavioral model 900 may be implemented as a table containing three different fields of data associated together. Phase ID 902 may be an identification number representing the phase of acquisition such as, first meeting, illustration, offer, taken and/or any additional phases that may be required to make an acquisition. Behavior 904 may be a reference to the behavior found during any of the phases. Examples of behaviors 904 may include, nervous, distracted, impatient and/or any range of actions that a client (also referred to as a user) may develop during the different phases of an acquisition. Score 906 may be a numerical calculated value which may serve as an indication that the behavior 904 found during a specific phase may lead to a client not completing the acquisition or dropping at a specific phase. For example, a nervous behavior 904 recorded during a phase with a phase ID 902 of 1 may generate a score 906 of 10 that may serve as an indication that the client has a 10% probability of dropping during the phase associated with ID 1. Summation, average, normalization or any methods of scoring may be used to generate score 906. Additional fields of data may also exist and are to be considered within the scope of this disclosure. Behavioral model 900 may be stored in a behavioral model database.

Figure 10:
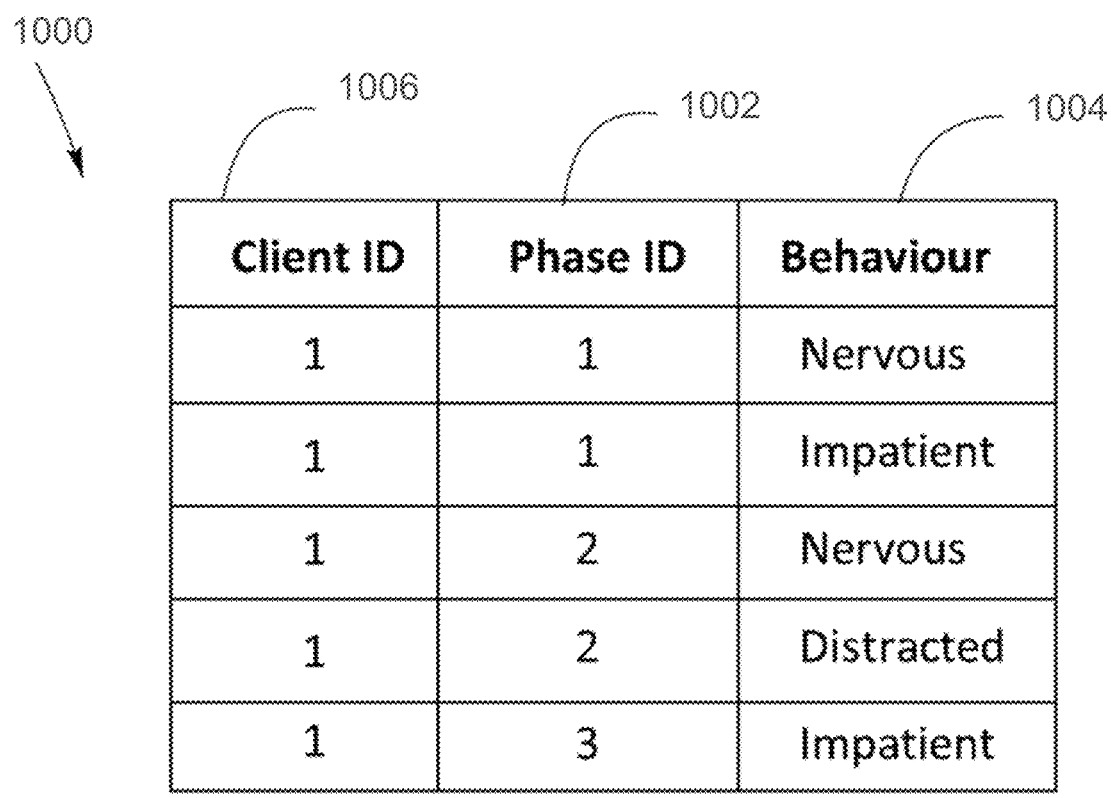
FIG. 10 shows an illustrative behavioral record, according to an embodiment.

FIG. 10 shows an illustrative behavioral record 1000, according an embodiment. A computer may generate the behavioral record 1000 based on sensor data (or sensor measurement) by one or more of the devices described in FIGS. 3, 4A, 4B, 5, 6A, 6B. As shown in FIG. 10, user behavioral record 1000 may be a table containing data related to behaviors presented by clients (also referred to as users) during the different phases of an acquisition. User behavioral record 1000 may include three different fields of data associated together. Phase ID 1002 may be a unique identification number representing the phase of acquisition such as, first meeting, illustration, offer, taken and/or any additional phases that may be required to make an acquisition. Behavior 1004 may be a reference to the behavior found during the phases represented by phase ID 1002. Examples of behaviors 1004 may include, nervous, distracted, impatient and/or any range of actions that a client may develop during the different phases of an acquisition. Client ID 1006 may be an identification number representing each individual client. Each client ID 1006 may uniquely represent an individual client. The three way association between phase ID 1002, behavior 1004 and client ID 1006 may represent that a client identified by client ID 1006 developed the specific behavior 1004 during the phase identified by phase ID 1002. For example client "James" uniquely identified and associated with client ID 1006 number 1 presented a nervous behavior 1004 during the first meeting which may be uniquely identified by phase ID 1002 number 1. Additional fields of data may also include, name of the client, last name, phone number or/and any information that may be related to the client.

Figure 11:
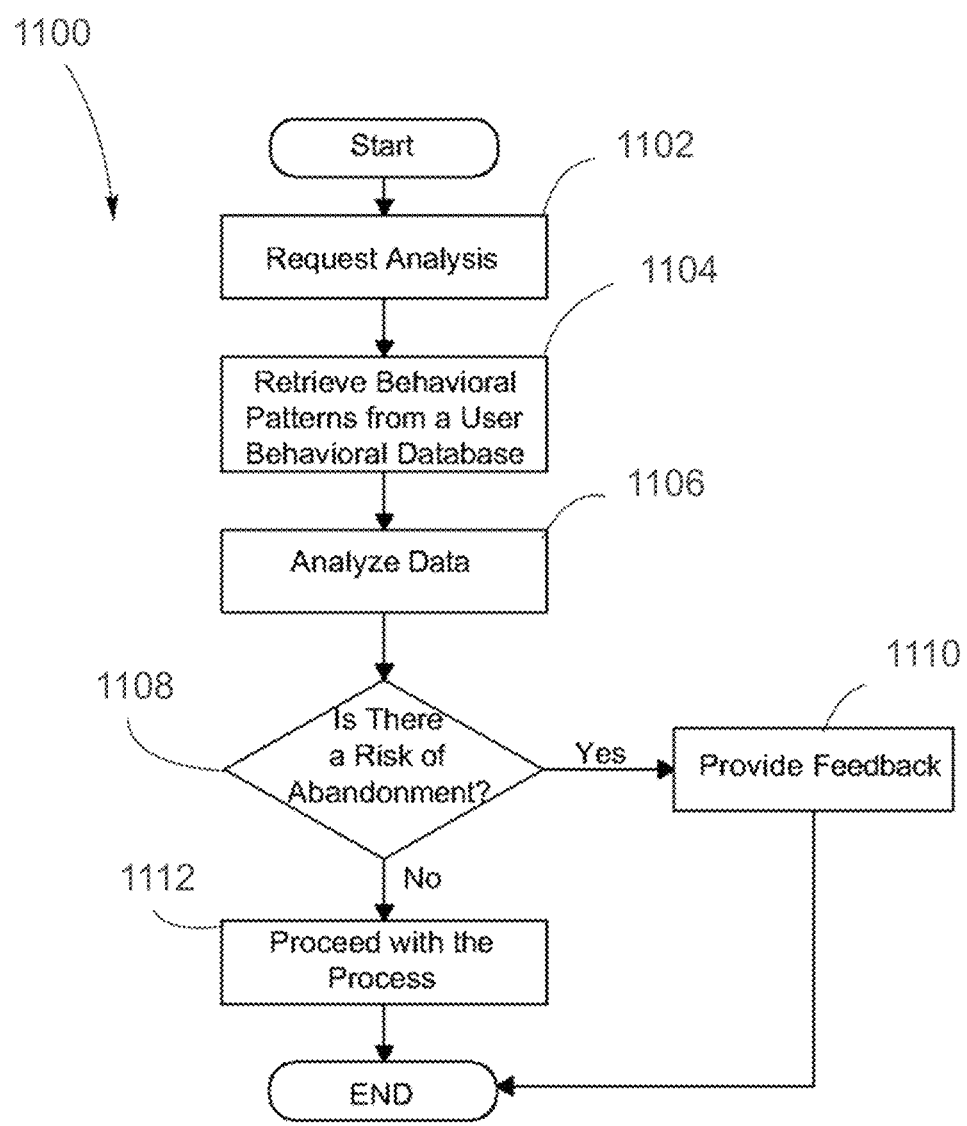
FIG. 11 shows a flowchart of an illustrative method of analyzing user behavior, according to an embodiment.

FIG. 11 shows a flowchart of an illustrative method 1100 of analyzing user (or client) behavior, according to an embodiment. The method 1100 may be implemented by one or more computing devices which may include one or more processors, one or more storage devices, one or more computer interfaces, one or more software modules, one or more set of instructions and/or one or more algorithms. While the blocks in the illustrative method 1100 are shown in a particular order, the actual order may differ. In some embodiments, some steps may be performed in parallel.

The method 1100 may begin when an agent or sales person requests an analysis for a client at step 1102. The agent may provide behavioral patterns that a client has presented during a phase through a user interface displayed by an extraction module which in turn may store these behavioral patterns in a user behavioral database. In another embodiment, the extraction module may automatically request the analysis at step 1102 by extracting behaviors from a customer that were captured using video devices, audio devices, or mobile devices. For example, the behavioral patterns may be based on sensor data (or sensor measurement) by one or more of the devices described in FIGS. 3, 4A, 4B, 5, 6A, 6B. Storing the behavioral patterns of a client may be done at the same time as the analysis request or may be done previously. User behavioral databases may store information describing behaviors and/or moods of clients at any phase of the acquisition process.

Subsequently, at step 1104, one or more analysis modules from the behavioral analysis system retrieve behavioral patterns for the specified customer from the user behavioral database. In some embodiments, the analysis module accesses a behavioral model database. In these embodiments, the behavioral model database includes reliable behavioral models, predictive indicators, patterns, trends, psychological profiles of actual customers and lost customers, and the like. For example, a behavioral model database may have prerecorded data that identified that a trend or pattern of abandonment exists when the customer is nervous or impatient during a specific phase.

The behavioral patterns of the client are analyzed 1106 and compared against the behavioral models of the behavioral model database in order to determine a score that represents the likelihood the customer will dropout at a specific phase of the acquisition process. In some embodiments, the score is based on the incidence of abandonment of previous lost customers who presented substantially similar behavior. In these embodiments, the higher the incidence of abandonment, the higher the score that may be received from the analysis module. Further to these embodiments, the score may be a numerical value which may serve as an indication that the behavior patterns found during a specific phase may lead to a customer not completing the acquisition or dropping at a specific phase. In some embodiments, the analysis module then determines a different score for each behavior pattern found for the client during each phase. In these embodiments, the different scores calculated for each behavioral pattern found during a phase may then be computed or normalized into a single compound score that can serve as an indication that a client may abandon the acquisition during that specific phase.

At step 1108, the scores are used to determine if a risk of abandonment from a customer exists at a specific phase. In some embodiments, a score threshold may be previously established to measure the odds of abandonment for a client for each phase. In these embodiments, whenever a score reaches a previously established threshold a risk of abandonment may exist. For example, a behavioral pattern ranked first with probabilities of 90% abandonment may represent high risk of client abandoning the associated phase. If at step 1108 a risk for abandonment exists during a specific phase, the method 1100 advances to step 1110 where the feedback module provides feedback 1110. In some embodiments, feedback includes prompting the agent to follow other specific steps in order to decrease the risk of abandonment. Furthermore, feedback, recommendations and/or guidelines, may be provided in the specific phase of the process where a risk for abandonment was identified. Actions to perform in case of a risk of abandonment may be prerecorded and stored in a database or in memory of a feedback module. The actions may also include score indicators that reflect a possible reduction in the risk of abandonment if the action is performed during the phase. The feedback module may select the action that better minimizes the risk of abandonment and suggested to the user. In an example, a high risk of abandonment may be identified during the illustration phase, the feedback module may identify that adding additional benefits to the product may minimize the risk of abandonment. The feedback module then prompts the user through the UI to present the customer with the additional benefits in order to minimize the risk of abandonment during the illustration phase.

Subsequently, if at step 1108 there is no risk of abandonment, method 1100 advances to step 1112 where analysis module may prompt the agent to proceed with the next phase in the acquisition process. In some embodiments, analysis module sends a message and/or a signal including the result of the analysis and the conclusion with no risk of abandonment.

In one embodiment, the method 1100 is implemented once during each of the phases of an acquisition process such as the ones described in FIG. 8. In another embodiment, the method 600 may be implemented one or more times during each of individual phases in an acquisition process. In yet another embodiment, the method 800 may be implemented one or more times, in real-time, during each of individual phases in an acquisition process.

The processes described herein may be executed through one or more computing devices of the system described in FIG. 1, allowing the system for improving client acquisition based on behavioral patterns a more efficient and faster processing of larger data sets. System for improving client acquisition based on behavioral patterns allows an insurance agent to quickly analyze customer behavior using an automated and faster method than possible with human-intervention data-driven analysis. In this way, efficiencies are created by providing the insurance company agent with advice or actions to take in order to minimize the risk of abandonment by a customer during the different phases of acquisition.

Example #1

A user may have a mobile device on his or her pocket all the time. The accelerometers in the mobile device may continuously take measurements. The mobile device may pipe in these measurements to a server. The server may determine movement behavior of the user based on these measurements. In some embodiments, the server may store historical movement behavior based upon accelerometer measurements over a period of time. Based on the historical movement behavior and/or real time data that is being piped in, the server may determine if the user has shown a certain movement pattern. For example, the user may have a normal pace of walking, as indicated by the historical accelerometer data. As the accelerometer data gets piped in, the server may compare the data that is being piped in with the historical data to determine whether there is change in the movement pattern. For example, the server may determine that the user is walking unusually fast, which may indicate that the user is nervous. In some embodiments, the server may determine that the user is walking unusually fast and therefore nervous without the benefit of historical data associated with a user. The server may store, for example, a baseline data about normal human movement, and may compare the piped in data with the baseline data to make a determination of the movement behavior to the user. In some embodiments, the server may determine the movement behavior based on the real-time data alone. The real-time data may indicate rapid changes in accelerometer measurements indicating that the user is making sudden movements. Based on the real-time data, the server may determine that the user is walking fast.

In addition to the accelerometer measurements, the server may receive measurements from other sensors as well. For example, a light sensor (e.g., a camera) may track the user's eye movement when the user is looking at the display of the mobile device. The light sensor may determine where the user's gaze is directed to on the display of the mobile device. The mobile device may pipe in the user's gaze data to the server and the server may determine the user's gaze behavior based upon the piped in data. The server may determine, from the piped in user's gaze data, that the user changes his or her gaze frequently thereby indicating a nervous behavior.

Based on the measurements (and other data) received from the sensors, the server may generate a behavioral data record. The behavioral data record may include a user behavior based upon the sensor measurements. For example, the behavioral data record may indicate that the user is nervous, impatient, and/or distracted. For example, the server may utilize the measurement data received from the accelerometer to determine that the user is nervous due to a faster than normal walking movement. The server may also utilize the gaze data received from the light sensors to determine that the user is distracted. For example, the user's gaze may constantly change from looking at the display and looking elsewhere. In this example, the behavioral data record may include an indication of the first behavior, e.g., nervous and an indication of the second behavior, e.g., distracted.

The server may calculate a score associated with each of the first and second behaviors. The server may calculate a first score associated with the first behavior, wherein the first score may indicate a likelihood of the user opting out of a product being presented to the user. The first score may be based upon historical and statistical data. The server may also calculate a second score associated with the second behavior, wherein the second score may also indicate a likelihood of the user of opting out of the product being presented to the user. For example, the first score of 10 for the nervous behavior may indicate that there is a probability of 10% that the user may opt out of the product being presented. Similarly, a second score of 20 for the distracted behavior may indicate that there is a probability of 20% that the user may opt out of the product being presented. The server may also calculate a composite score for the behavioral data record containing the first and the second behaviors, wherein the composite score may be a normalization or an average of the first and second scores.

Based on the composite score, the server may present a customized electronic content to be displayed by the mobile device. For example, the customized electronic content may additional information about the product being presented. When the user is nervous and/or distracted, the customized electronic content may contain a soothing image with some calming information about the product being presented. For instance, the product being presented may be aromatherapy candles to relive stress, and the customized electronic content may include a soothing background (e.g., a waterfall) wherein the aromatherapy candles are juxtaposed.

It should be understood that that aforementioned description of sensor measurements on the device side and further processing on the server side is merely illustrative and other modifications should be considered within the scope of this disclosure. For example, one or more of the aforementioned server side processing steps may be performed at the mobile device itself.

Example #2

In this example, a server may receive data piped in from the accelerometers and the GPS sensors in a mobile device of a user. The GPS sensors may process GPS signals from available GPS satellites to geolocate the mobile device. Geolocating the mobile device may also refer to determining a direction of travel of the mobile device in addition to the determining the location of the mobile device. Based upon the piped in data from the accelerometers and the GPS sensors, the server may determine if the user is on an automobile. For example, the GPS sensors may indicate that the geolocation of the mobile device is continually changing while the accelerometer data may be consistent with jolts and jerks of a moving automobile. Furthermore, the server may determine that the user may be driving in a stop-and-go traffic on city blocks. The server may also determine that there is frequent hard braking to avoid collisions in the stop and go traffic.

The server may also process historical data to determine if the driving behavior of the user has changed. For example, the user may have reduced the amount of driving at stop and go traffic and increased the amount of highway driving. The increased amount of highway driving may indicate that the user may be less prone to vehicular accidents and therefore qualifies for a cheaper insurance product. The server may generate a customized electronic content containing information about an insurance product that may be cheaper than the user's current insurance. The information may include a link that the user can make to automatically access a website to sign for an updated quote. Alternatively, the information may include the link, which when selected by the user automatically makes a phone call.

It should be understood that that aforementioned description of sensor measurements on the device side and further processing on the server side is merely illustrative and other modifications should be considered within the scope of this disclosure. For example, one or more of the aforementioned server side processing steps may be performed at the mobile device itself.

Example #3

A mobile device may also provide application usage data to the server. The application usage data may include the number of applications that a user has downloaded and/or used. The application usage data may also indicate numbers of times that the user has opened or closed one or more applications. The application usage data may further indicate the number of times the user has instructed applications to be run in the foreground or in the background. To generate the application usage data, the mobile device may maintain an internal usage log with timestamps to track the various application related activities performed by the user. In some embodiments, the mobile device may transmit one or more log files containing the internal usage log as usage data to the server.

The server may generate a user behavioral data record based upon the application usage data received from the mobile device. For example, if the application usage data indicates that the user frequently uses and closes unrelated applications, the server may generate a user behavioral data record indicating a nervous behavior. As another example, if the application usage data indicates that the user has kept open and used an application for a long duration, the server may generate a user behavioral data record indicating a focused behavior. If the user has opened a large number of applications with frequent switches between the applications, the server may generate a user behavioral data record indicating a distracted behavior.

The server may also calculate a likelihood score associated with each behavior based upon an internal metric. The internal metric may contain a baseline behavior pattern based upon observed behavior of a population of users. In some embodiments, the server may modify use different internal metrics based on the attributes of the user. For example, if the user is within an age group of 24-35, the server may use an internal metric with baseline behavior pattern for the age group of 24-35. This age group may be tech-savvy and prone to multitasking, therefore their baseline behavior may be significantly different from an elderly age group of people between the ages of 61-70. The likelihood score associated with each behavior may indicate a probability that the user will opt out of a product being presented. For example, if the likelihood score associated with a nervous behavior is 10, there may be a 10% probability that the nervous user may opt out the product being presented.

The server may also compare a user's historical application usage with a current application usage to provide a customized electronic content to the user. The mobile device may transmit and the server may receive a first set of log files. The first set of log files may have entries showing the usage of a first set of applications in the mobile device. For instance, a log file may have a statuses of applications entered against corresponding timestamps. For example, the log file may show that an application was opened at time t1, was running in the foreground between times t1 and t2, was running in the background between times t2 and t3, and was closed at time t3. The log file therefore may show how the user interacts with the application, e.g., how often the user switches between the applications. Based on the first set of set of log files, the server may generate a historic usage behavior data record, which may indicate the normal pattern of application usage behavior of the user.

The server may also receive a second set of log files from the mobile device and generate a second application usage behavior data record based on the second set of log files. The second application usage behavior data record may indicate the current pattern of application usage behavior of the user. In some embodiments, the server may generate the first and second application usage behavior data records based upon the same set of applications in the mobile device. In other embodiments, the server may generate the first application usage behavior data record based upon the first set of applications and the second application usage behavior based upon a second set of applications. The server may compare the first application usage behavior data record with the second application usage behavior data record. For example, the server may determine differences between various attributes in the first and second application usage behavior data records. The various attributes may include, for example, duration that an application is kept running, number of applications running at a point in time, duration between opening of a first application and a second application, number of applications running in the foreground, number of applications running in the background, and frequency of switching between the applications. If the server determines that a difference between an attribute in the first application usage behavior data record and a corresponding attribute in the second application usage behavior data record is above a threshold, the server may present a customized electronic content to be displayed on the mobile device. The server may determine the threshold based upon application usage pattern of a population of users.

The difference above a threshold may indicate that there is a change in user behavior. For example, the user may have become more nervous or distracted and the server may generate the customized electronic content to generating a soothing effect on the user. For example, the customized electronic content may have information about a relaxing product (e.g., aromatherapy candles) juxtaposed within a pleasing natural image (e.g., a waterfall). The customized electronic content may also include a link, which when selected by the user causes the mobile device to automatically call an entity associated with the customized electronic content (e.g., the aromatherapy candles manufacturer).

It should be understood that that aforementioned description of sensor measurements on the device side and further processing on the server side is merely illustrative and other modifications should be considered within the scope of this disclosure. For example, one or more of the aforementioned server side processing steps may be performed at the mobile device itself.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:
   receiving, by a server, sensor data from one or more tracking sensors of a mobile device of a user, wherein the sensor data contains a first and a second set of sensor measurements made continuously by the one or more tracking sensors;
   determining, by the server, a first behavior representing the first set of sensor measurements;
   determining, by the server, a second behavior representing the second set of sensor measurements;
   generating, by the server, behavioral pattern data records based upon the first and second behaviors;
   calculating, by the server, a first score for the first behavior and a second score for the second behavior;
   calculating, by the server, a product score associated with a product based on the behavioral pattern data records, wherein the product score is a normalization of the first and second scores;
   identifying, by the server, a phase associated with the user and the product; and
   presenting, by the server, customized electronic content for the product for display on a user interface of the mobile device based on the product score and the identified phase, wherein the customized electronic content includes a message to the user and is associated with an image shown by the mobile device.

2. The computer-implemented method according to claim 1, wherein the one or more tracking sensors include at least one of eye-tracking sensor, head tracking sensor, accelerometer, magnetometer, light sensor.

3. The computer-implemented method according to claim 1, further comprising:
   receiving, by the server, updated sensor data from the one or more tracking sensors of the mobile device of the user;
   updating, by the server, the behavioral pattern data records based upon the updated sensor data;
   updating, by the server, the product score associated with the product based on the updated behavioral pattern data records;
   identifying, by the server, a new phase associated with the user and the product; and
   causing to display, by the server, an updated customized electronic content for the product on a user interface of the mobile device based on the updated product score and the new phase.

4. The computer-implemented method according to claim 3, wherein the customized electronic content for the product is updated in real-time.

5. The computer-implemented method according to claim 1, wherein the behavioral pattern data records include data comprising a predictive indicator and a physiological profile of the user.

6. The computer-implemented method according to claim 1, wherein the behavior pattern data records indicate whether the user is nervous or impatient.

7. The computer-implemented method according to claim 1, wherein the product score is a risk score that the user will not be interested in the product.

8. The computer-implemented method according to claim 7, further comprising:
generating, by the server, a second message comprising at least one feedback action in response to the server determining that the risk score is above a calculated threshold.

9. The computer-implemented method according to claim 7, wherein the risk score is based upon an aggregation of individual risk scores associated with individual behaviors in the behavioral pattern data records.

10. The computer-implemented method according to claim 1, wherein the mobile device includes at least one of a mobile phone, smartphone, a personal digital assistant, and a laptop.

11. A computer-implemented method comprising:
receiving, by a server, a first set of sensor measurements from an accelerometer and a global positioning sensor of a mobile device associated with a user, sensor measurements from the accelerometer representing jolts and jerks of a vehicle while being driven, and sensor measurements from the global positioning sensor representing one or more locations and directions of travel of the vehicle;
generating, by the server, a first driving behavior data record of the user based upon the first set of sensor measurements, the first driving behavior data record indicating that the vehicle is being driven in a stop and go city traffic;
receiving, by the server, a second set of sensor measurements from the accelerometer and the global positioning sensor of the mobile device;
generating, by the server, a second driving behavior data record of the user based upon the second set of sensor measurements; and
in response to the server determining that the second driving behavior data record indicates the vehicle is being driven on a highway:
presenting, by the server, a customized electronic content configured to be displayed on the mobile device, the customized electronic content including a link, which when selected causes the mobile device to make a phone call to an entity associated with the customized electronic content.

12. The computer-implemented method of claim 11, wherein the customized electronic content further includes an audio configured to be played by the mobile device.

13. The computer-implemented method of claim 11, wherein the customized electronic content further includes a video configured to be played by the mobile device.

14. The computer-implemented method according to claim 11, wherein the mobile device includes at least one of a mobile phone, smartphone, a personal digital assistant, and a laptop.

15. The computer-implemented method according to claim 11, wherein the first driving behavior data record indicates a historical driving behavior of the user and the second driving behavior data record indicates a current driving behavior of the user.

16. A system comprising:
a non-transitory storage medium storing computer program instructions;
a processor electrically coupled to the non-transitory storage medium and configured to execute the computer program instructions to:
receive a first set of log files from a mobile device, each log file in the first set of log files including entries of usage of a first set of applications installed in the mobile device in association with corresponding timestamps;
generate a first application usage behavior data record of a user based upon the first set of log files;
receive a second set of log files from the mobile device, each log file in the second set of log files including entries of usage of a second set of applications installed in the mobile device in association with the corresponding timestamps;
generate a second application usage behavior data record of the user based upon the second set of log files; and
in response to the processor determining difference between an attribute in the first application usage behavior data record is different from a corresponding attribute in the second application usage behavior data record:
present a customized electronic content configured to be displayed on the mobile device, the customized electronic content including wherein the customized electronic content includes a message to the user and is associated with an image shown by the mobile device.

17. The system according to claim 16, wherein the first application usage behavior data record indicates a historical application usage behavior of the user and the second application usage behavior data record indicates a current application usage behavior of the user.

18. The system according to claim 16, wherein the attribute in the first application usage behavior data record and the corresponding attribute in the second usage behavior data record include at least one of duration that an application is kept running, number of applications running at a point in time, duration between opening of a first application and a second application, number of applications running in the foreground, number of applications running in the background, and frequency of switching between the applications.

19. The system according to claim 16, wherein first and second set of applications refer to the same set of applications.

20. The system according to claim 16, wherein the customized electronic content further includes a link, which when selected causes the mobile device to make a phone call to an entity associated with the customized electronic content.

* * * * *